(12) United States Patent
Ebihara et al.

(10) Patent No.: US 8,578,687 B2
(45) Date of Patent: Nov. 12, 2013

(54) MOWER DECK LIFTING DEVICE OF RIDE-ON MOWER

(75) Inventors: Tomoyuki Ebihara, Osaka (JP); Kazuma Moriguchi, Osaka (JP); Keiichi Hayashi, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 0 days.

(21) Appl. No.: 13/383,435

(22) PCT Filed: Oct. 22, 2010

(86) PCT No.: PCT/JP2010/068723
§ 371 (c)(1),
(2), (4) Date: Jan. 11, 2012

(87) PCT Pub. No.: WO2011/092908
PCT Pub. Date: Aug. 4, 2011

(65) Prior Publication Data
US 2012/0111655 A1 May 10, 2012

(30) Foreign Application Priority Data

Jan. 29, 2010 (JP) ................... 2010-018298
Feb. 2, 2010 (JP) ................... 2010-021113
May 19, 2010 (JP) ................... 2010-115104

(51) Int. Cl.
*A01D 34/00* (2006.01)

(52) U.S. Cl.
USPC .......................................................... 56/17.1

(58) Field of Classification Search
USPC .................. 56/17.1, 14.9, 15.8, 15.9
See application file for complete search history.

(56) References Cited

U.S. PATENT DOCUMENTS

| | | | | |
|---|---|---|---|---|
| 2,502,063 A | * | 3/1950 | Rust | 56/15.8 |
| 2,822,654 A | * | 2/1958 | Elfes et al. | 56/10.6 |
| 3,234,719 A | * | 2/1966 | Rank | 56/13.6 |
| 3,619,996 A | * | 11/1971 | Jacobson et al. | 56/13.6 |
| 3,654,749 A | * | 4/1972 | Ostergren et al. | 56/15.8 |
| 3,721,076 A | * | 3/1973 | Behrens | 56/14.9 |
| 4,120,136 A | * | 10/1978 | Rose | 56/17.1 |
| 4,747,257 A | * | 5/1988 | Hutchison | 56/15.8 |
| 5,381,648 A | * | 1/1995 | Seegert et al. | 56/17.1 |

(Continued)

FOREIGN PATENT DOCUMENTS

| | | |
|---|---|---|
| JP | 57-024106 U | 2/1982 |
| JP | 5-085206 U | 11/1993 |

(Continued)

OTHER PUBLICATIONS

Swisher ZT2766KZ 27 HP—66" Cut, Relevant pp. 23-35, Dated 2008.*

*Primary Examiner* — Árpád Fábián-Kovács
(74) *Attorney, Agent, or Firm* — Birch, Stewart, Kolasch & Birch, LLP

(57) ABSTRACT

A ride-on mower can easily lift mower deck up and down so that it remains horizontal. The ride-on mower has driving motors, mower blades spinning for mowing grass, mowing motors for the mower blades, batteries for the driving motors and the mowing motors, a mower deck for covering the mower blades from the above and sides and for setting the mowing motors on, and a mower deck lifting device for lifting up and down the mower deck. The mower deck lifting device has a booster for assisting the mower deck lifting device in lifting the mower deck up and down, and the mower deck lifting device is set at the center on the mower deck.

12 Claims, 29 Drawing Sheets

(56) References Cited

U.S. PATENT DOCUMENTS

| | | | | |
|---|---|---|---|---|
| 5,771,672 A | * | 6/1998 | Gummerson | 56/15.4 |
| 5,794,422 A | * | 8/1998 | Reimers et al. | 56/11.9 |
| 5,816,035 A | * | 10/1998 | Schick | 56/15.2 |
| 5,927,055 A | * | 7/1999 | Ferree et al. | 56/15.9 |
| 6,122,903 A | * | 9/2000 | Hayashi et al. | 56/15.8 |
| 6,293,077 B1 | * | 9/2001 | Plas et al. | 56/17.1 |
| 6,339,916 B1 | * | 1/2002 | Benson | 56/10.2 R |
| 6,427,430 B1 | * | 8/2002 | Swartzendruber | 56/16.3 |
| 6,530,200 B1 | * | 3/2003 | Minoura et al. | 56/17.1 |
| 6,588,188 B2 | * | 7/2003 | Dennis | 56/16.3 |
| 6,625,968 B2 | * | 9/2003 | Gloudemans et al. | 56/17.1 |
| 6,675,567 B2 | * | 1/2004 | Samejima et al. | 56/16.7 |
| 6,868,658 B2 | * | 3/2005 | Velke et al. | 56/15.8 |
| 6,988,351 B2 | * | 1/2006 | Schick et al. | 56/15.9 |
| 7,089,722 B2 | * | 8/2006 | Laskowski | 56/14.9 |
| 7,293,398 B2 | * | 11/2007 | Koehn | 56/15.9 |
| 7,318,311 B2 | * | 1/2008 | Wright et al. | 56/17.1 |
| 7,347,039 B2 | * | 3/2008 | Koehn | 56/15.9 |
| 7,448,191 B2 | * | 11/2008 | Elhardt et al. | 56/17.1 |
| 7,451,586 B1 | * | 11/2008 | Papke et al. | 56/15.9 |
| 7,546,723 B2 | * | 6/2009 | Melone et al. | 56/15.8 |
| 7,669,395 B2 | * | 3/2010 | Wehler et al. | 56/15.9 |
| 7,726,110 B2 | * | 6/2010 | Nicholson | 56/320.2 |
| 7,730,705 B2 | * | 6/2010 | Kubinski | 56/17.1 |
| 7,770,370 B2 | * | 8/2010 | Komorida et al. | 56/17.1 |
| 7,882,914 B2 | * | 2/2011 | Scheele et al. | 180/89.14 |
| 8,141,886 B1 | * | 3/2012 | Sugden et al. | 280/32.5 |
| 2002/0059788 A1 | * | 5/2002 | Velke et al. | 56/14.7 |
| 2002/0194826 A1 | * | 12/2002 | Schick et al. | 56/15.9 |
| 2004/0065071 A1 | * | 4/2004 | Kalista et al. | 56/17.2 |
| 2004/0093840 A1 | * | 5/2004 | Velke et al. | 56/15.8 |
| 2005/0044836 A1 | * | 3/2005 | Goto et al. | 56/14.7 |
| 2009/0260901 A1 | | 10/2009 | Ishii et al. | |
| 2012/0266580 A1 | * | 10/2012 | Ulmefors et al. | 56/10.2 R |

FOREIGN PATENT DOCUMENTS

| | | |
|---|---|---|
| JP | 7-023641 A | 1/1995 |
| JP | 7-095809 A | 4/1995 |
| JP | 7-132718 A | 5/1995 |
| JP | 2008-290512 A | 12/2008 |
| JP | 2009-255840 A | 11/2009 |

* cited by examiner

MOWER DECK LIFTING DEVICE OF RIDE-ON MOWER

BACKGROUND OF THE INVENTION

1. Field of the Invention

This invention relates to an electric ride-on mower having driving motors for motion, rotatable mower blades for mowing grass, mowing motors for spinning the mower blades, and batteries for the driving motors and the mowing motors.

2. Description of the Related Art

A conventional ride-on lawn mower (a ride-on mower) with an engine, which moves and mows lawns by mower blades that spin using engine power.

3. Prior Arts

Japanese patent publication No. 2008-290512.

PROBLEM TO BE SOLVED BY THE INVENTION

A recent trend has been to reduce exhaust gas emissions, including greenhouse gases, for the sake of minimizing global warming. This trend is notable in the car industry, in which eco cars such as hybrid and electric cars have been developed. In particular, electric cars with batteries are actively being put to practical use.

However, this technological development is less active in the area of agricultural machines. In particular, little development has been done in the area of ride-on mowers.

This invention firstly provides an electric ride-on mower. In the conventional lawn mower, which has an engine behind the driver's seat, the engine power is used for spinning mower blades underneath the driver's seat, as well as for turning rear wheels.

The electric ride-on mower in this invention uses mowing motors for spinning the mower blades. In doing so, it efficiently connects the motor axis directly with the spinning center of the mower blade to avoid transmission power loss. In this case, the mowing motors should be set on a mower deck that covers the mower blades. During mowing, it is necessary to set the mowing height for mowing the grass. With a conventional ride-on mower, the mowing height is set by a mower deck lifting lever, which is installed at the right side of the driver's seat.

When controlling the height of the mower deck, the mower blades, which are installed inside of the mower deck, are also lifted upwards and downwards. The mower deck lifting lever is heavy to operate. Furthermore, in this conventional invention, the mowing motors are set on the mower deck. Therefore, it is very heavy to adjust the mowing height using a conventional mower deck lifting lever.

To address this problem, it is possible to apply a conventional booster, which can lift the heavy mower deck up and down, to the electric working mower deck. However, it is not easy to set the booster on a conventional mower deck because two pulleys with a belt are set at the center on the mower deck to transmit the engine power to the two mower blades. Therefore, the booster can only be set at either the right or left side of the mower deck in a conventional lawn mower. This makes it difficult to lift the mower deck up and down while keeping the deck in a horizontal plane. As a result, the height of the mower deck is uneven on both sides, which makes it difficult to mow lawn to a pre-determined mowing height. The objective of this invention is to provide an electric ride-on mower that allows the mower deck to be easily lifted up and down while keeping the deck in a horizontal plane.

SUMMARY OF THE INVENTION

Means to Solve the Problem

An electric ride-on mower having:
  driving motors,
  mower blades spinning for mowing grasses,
  mowing motors for the mower blades,
  batteries for the driving motors and the mowing motors,
  a mower deck for covering the mower blades from the above and sides and for setting the mowing motors on, and
  a mower deck lifting device for lifting up and down the mower deck, wherein:
    the mower deck lifting device includes a booster for assisting the mower deck lifting device to lift the mower deck up and down, and
    the mower deck lifting device is set at the center on the mower deck.

This invention is further able to include the feature of an electric ride-on mower having:
  a pair of chassis stretching out towards the driving direction, wherein:
    one end of a pair of deck support arms is fixed to each side of the mower deck in a rotatable way,
    another end of a pair of deck support arms is fixed to each chassis in a rotatable way, and
    the mower deck lifting device is fixed to the deck support arms through a link mechanism.

This invention is further able to include the feature of an electric ride-on mower having:
  a rotatable lifting lever for lifting the mower deck up and down with the mower
  deck lifting device, and
  guide plates, which are installed at the side of the lifting lever, for setting the mower deck at different heights, wherein:
    the guide plates have multiple notches,
    the lifting lever has lock plates that can engage one of the notches and hold the position of the lifting lever,
    the guide plates are installed in parallel and at different levels,
    the guide plates are installed separately so that the notches of each guide plate cannot be matched with the notches of other guide plates, and
    the lock plates are able to reach the notches of all the guide plates.

This invention is further able to include the following feature:
  the guide plates are set at one side of the lifting lever.

This invention is further able to include the following feature:
  the guide plates are set at both sides of the lifting lever.

This invention is further able to include the feature of an electric ride-on mower having:
  a pair of chassis stretching out towards the driving direction,
  suspensions set at the front of each chassis, which are able to work independently,
  front wheels, which turn freely and are set underneath the suspensions,
  front wheel shafts set at the turning center of each front wheel, and
  front wheel holding parts for holding the front wheel shaft.

This invention is further able to include the feature of an electric ride-on mower having:
horizontally rotating support parts for supporting the front wheel holding part horizontally in a rotatable way, wherein:
the suspensions are set in the horizontally rotating support parts.

This invention is further able to include the feature of an electric ride-on mower having:
a pair of chassis stretching out towards the driving direction,
a turning center set between the chassis,
a beam, which turns around the turning center and stretches out towards the side direction of the main body,
elastic parts for keeping the beam horizontal,
front wheel holding parts for horizontally holding the front wheels in a rotatable way, and
horizontally rotating support parts for holding the front wheel holding part horizontally in
a rotatable way, wherein:
the lower part of the horizontally rotating support parts are fixed at each end of the beam, and
the elastic part is set at the upper part of the horizontally rotating support part.

This invention is further able to include the following feature:
the elastic part, which includes:
a holding part,
a sliding part able to slide in the holding part, and
a coil spring set to touch both a holding part stopper, which is fixed at the surface of the holding part, and a sliding part stopper, which is fixed at the surface of the sliding part.

Advantages of the Invention

An electric ride-on mower having:
driving motors,
mower blades spinning for mowing grasses,
mowing motors for the mower blades,
batteries for the driving motors and the mowing motors,
a mower deck for covering the mower blades from the above and sides and for setting the mowing motors on, and
a mower deck lifting device for lifting up and down the mower deck, wherein:
the mower deck lifting device includes a booster for assisting the mower deck lifting device to lift the mower deck up and down, and
the mower deck lifting device is set at the center on the mower deck.

Therefore, the driver can easily lift up and down the mower deck, on which the mowing motors are set. In addition, the driver can lift the mower deck up and down evenly in the horizontal plane because the mower deck lifting device is located in the central area of the upper surface of the mower deck.

In addition, the invention can include an electric ride-on mower having a pair of chassis stretching out towards the driving direction, wherein:
one end of a pair of deck support arms is fixed to each side of the mower deck in a rotatable way,
another end of a pair of deck support arms is fixed to each chassis in a rotatable way, and
the mower deck lifting device is fixed to the deck support arms through a link mechanism.

In this case, the power of the booster can be transmitted to the deck support arm, and the mower deck can be easily lifted up and down.

Furthermore, the invention can include an electric ride-on mower having:
a rotatable lifting lever for lifting the mower deck up and down with the mower deck lifting device, and
guide plates, which are installed at the side of the lifting lever, for setting the mower deck at different heights, wherein:
the guide plates have multiple notches,
the lifting lever has lock plates that can engage one of the notches and hold the position of the lifting lever,
the guide plates are installed in parallel and at different levels,
the guide plates are installed separately so that the notches of each guide plate cannot be matched with the notches of other guide plates, and
the lock plates are able to reach the notches of all the guide plates.

In this case, the overall combined spacing of the notches, which is created by use of all guide plates, can be effectively shortened. This eliminates the problem of having closely spaced notches in one guide plate, which weakens the guide plate.

The invention is able to provide an electric ride-on mower in which the guide plates can maintain strength and the mower deck can be set to various heights.

Furthermore, the guide plates are set at one side of the lifting lever. In this case, multiple lock plates for multiple guide plates can be set at one side of the rotatable lifting lever. As a result, this invention saves space around the lifting lever.

In addition, the guide plates are set at both sides of the lifting lever. In this case, for example, two guide plates set at both sides of the lifting lever can allow the two guide plates to be set at the same distance from the lifting lever. This enables the above two guide plates to be made in duplicate. As a result, the invention can simplify the manufacturing process.

Furthermore, the invention can include the feature of an electric ride-on mower having:
a pair of chassis stretching out towards the driving direction,
suspensions set at the front of each chassis able to work independently,
front wheels, which turn freely and are set underneath the suspensions,
front wheel shafts, which are set at the turning center of each front wheel, and
front wheel holding parts for holding the front wheel shaft.

With this feature, impact at the front wheels from the ground can be absorbed by the suspensions. Therefore, vibration for the driver can also be reduced and the driver can operate the mower more comfortably. Furthermore, the front wheel shaft and the front wheel holding part can receive less vibration because the suspensions absorb the impact from the ground transmitted to the front wheels. The suspensions also make the front wheel shaft and the front wheel holding part more durable. In addition, if the motor drivers for the mowing motors are set near the front wheels, vibration from the ground to the motor drivers can be reduced.

This invention can include the feature of an electric ride-on mower having:
horizontally rotating support parts for supporting the front wheel holding part
horizontally in a rotatable way, wherein:
the suspensions are set in the horizontally rotating support parts.

With this feature, the mower does not need extra parts for fixing the suspensions, and an electric ride-on mower with a simple structure can be provided.

This invention can include the feature of an electric ride-on mower having:
- a pair of chassis stretching out towards the driving direction,
- a turning center being set between the chassis,
- a beam turning around the turning center and stretching out towards the side direction of the main body,
- elastic parts for keeping the beam horizontal,
- front wheel holding parts for horizontally holding the front wheels in a rotatable way, and
- horizontally rotating support parts for holding the front wheel holding part horizontally in a rotatable way, wherein:
  - the lower part of the horizontally rotating support parts are respectively fixed at each end of the beam, and
  - the elastic part is set at the upper part of the horizontally rotating support part.

With this feature, an electric ride-on mower, which can reduce the impact at the front wheels from the ground, can be provided. As a result, vibration for the driver can also be reduced and the driver can operate the mower comfortably. Furthermore, the front wheel shaft and the front wheel holding part can receive less vibration because the elastic part absorbs the impact from the ground to the front wheel. The suspensions make the front wheel shafts and the front wheel holding parts more durable. In addition, if motor drivers for the mowing motors are set near the front wheels, the impact from the ground to the motor drivers can be reduced. Furthermore, in the front view, the elastic part is made rectangularly; therefore, the elastic part is strengthened.

This invention can include the elastic part feature that incorporates:
- a holding part,
- a sliding part able to slide in the holding part, and
- a coil spring set to touch both a holding part stopper, which is fixed at the surface of the holding part, and a sliding part stopper, which is fixed at the surface of the sliding part.

BRIEF DESCRIPTION OF THE DRAWINGS

FIG. 8 Figures showing the mower deck height setting part.

DETAILED DESCRIPTION OF THE INVENTION

Best Mode of Embodying the Invention

Figure 1:
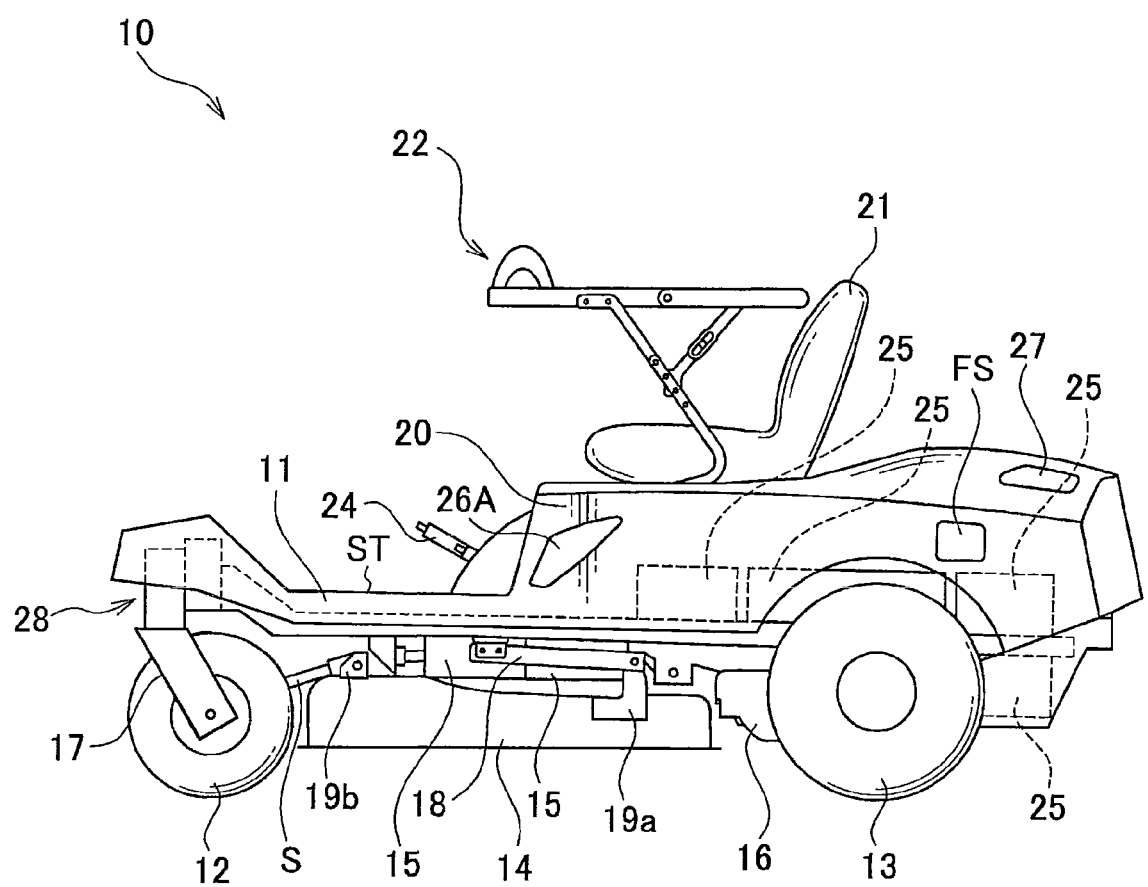
FIG. 1 A side view of the embodiment of the electric ride-on mower of this invention.
Figure 2:
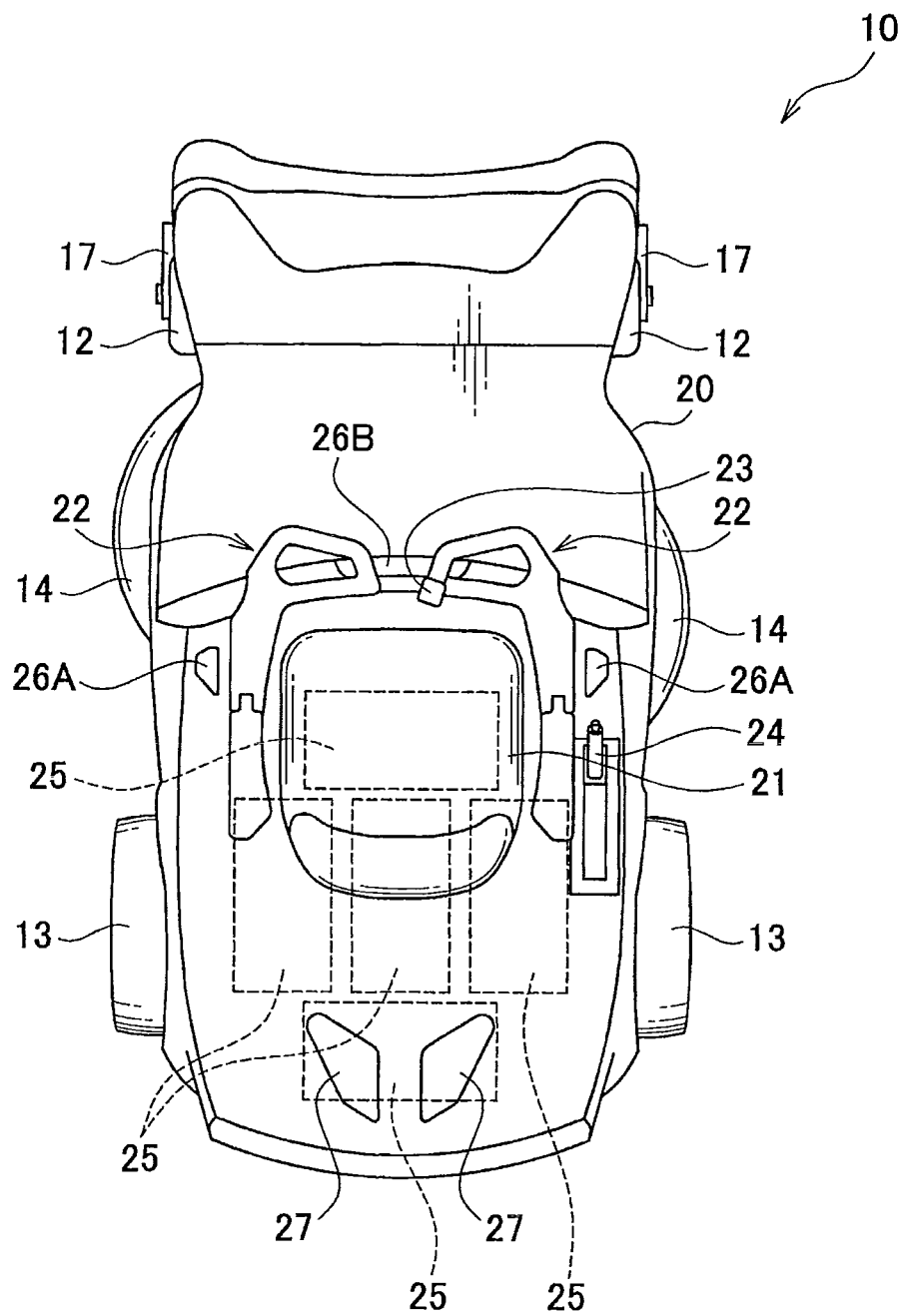
FIG. 2 A plain view of FIG. 1.

The best mode of embodying the invention is described below with reference to specific figures. FIG. 1 shows a plain view and FIG. 2 shows a side view of the electric lawn mower 10, which is the embodiment of the electric ride-on mower of this invention. The electric lawn mower 10 has a pair of chassis 11, 11 stretching out towards the driving direction, a pair of front tires (front wheels) 12 underneath the chassis 11, and a pair of rear tires (rear wheels) 13. The electric lawn mower 10 has also a mower deck 14 between the front tires 12 and the rear tires 13. The mower deck 14 has an oval-like dish shape set with its bottom up. Two mower blades are set inside the mower deck 14, side-by-side along the longer diameter of the oval-like mower deck 14. Two mowing motors 15, 15 are joined with the mower blades at the spinning center of each mower blade. The mower deck 14 is somewhat turning rightward (of the driving direction of the electric lawn mower 10) in the plain view. In other words, the spinning center of the right mower blade is a little behind that of the left mower blade.

A body cover (cowling) 20 is set over the whole chassis 11, 11 from the above. A driver's seat 21 is set on the body cover 20, and the driver's seat 21 is located ahead of the rear tires 13, 13. A pair of driving levers 22, 22 are set at both sides of the driver's seat 21. A mower deck lifting lever (a lifting lever) 24 is set at the outside of the right driving lever 22. The mower deck lifting lever 24 is to lift the mower deck 14 up and down to adjust the height of the mower deck 14 from the ground. Cooling openings 26A, 26A are located on each underside of the driver's seat 21 whereas a cooling opening 26B is located under the front of the driver's seat 21. The cooling openings 26A, 26A and 26B are to take in cool air for cooling down the batteries 25, and are located at the body cover 20. Two vents 27, 27 are set at the back of the driver's seat 21. The vent 27 helps let the air out that comes from the cooling openings 26A and 26B to cool the batteries 25. The two vents 27, 27 are also located in the body cover 20.

The electric lawn mower 10 uses the motors for driving as well as mowing. Two driving motors 16, 16 are set inside of the rear tires 13, 13 to turn the rear tires 13, 13. The driving motor 16 can be an in-wheel motor.

The electric power of the two mowing motors 15, 15 and the two driving motors 16, 16 is supplied from six batteries 25. The six batteries 25 are set inside the body cover 20, just underneath the driver's seat 21. More specifically, three batteries 25 are set on the chassis 11, 11 side-by-side between the axles of rear tires 13, 13. (The long side of each battery 25 should be placed along the driving direction.) Two other batteries 25, 25 should be put in front of and behind the above three batteries 25. The remaining battery 25 should be put underneath the chassis 11, 11 in between the axles of rear tires 13, 13. (The long side of this battery 25 should be placed along the driving direction.) These six batteries 25 are fixed on the chassis 11, 11 by brackets. Three batteries 25 form one battery unit connected in cascade. Therefore, the six batteries 25 form two units. It is possible to use three batteries 25 for the electric ride-on mower 10. In this case, the three batteries 25 can be put on the chassis 11, 11.

An electricity filler opening FS, which refills the batteries 25, is located at the fender of the left rear tire 13. The electricity filler opening FS is an opening with a cover and is located at the body cover 20. A plug is set inside of the electricity filler opening FS for receiving alternating current (AC). An AC adapter may be set between the batteries 25 and the plug if needed.

Motor drivers (controllers) are set above the batteries 25. The motor drivers are to control the driving motors 16. The motor drivers control the spinning direction and the spinning speed of the driving motors 16, 16 according to the leaning angle of the driving levers 22, 22. Other motor drivers for the mowing motors 15, 15 are set between the axles of the front tires 12, 12 as well as between the chassis 11, 11 (these motor drivers are later described as a mowing motor driver MD). The spinning speed of the mowing motor 15 is synchronized with the spinning speed of the driving motor 16 by the controller. More specifically, the faster the electric lawn mower 10 runs, the faster the mower blade spins and vice versa.

The front tires 12, 12 are each set on a front tire bracket (a front wheel holding part) 17 by a front shaft. The front tire 12 can rotate around the front shaft freely. The two front tire brackets 17, 17 are respectively fixed to the chassis 11, 11 and can horizontally turn around the chassis 11, 11 freely.

The driving lever 22 can turn forward and backward. When turned forward, the driving motor 16 spins forward. When turned backward, the driving motor 16 spins backward. The revolutions per minute of the driving motor 16 are synchronized with the tilt angle of the driving lever 22. The more the driving lever 22 is tilted forward (or backward), the quicker the driving motor 16 spins forward (or backward). The less the driving lever 22 is tilted forward (or backward), the slower the driving motor 16 spins forward (or backward). The driver is able to drive the electric lawn mower 10 forward or backward, and to turn the electric lawn mower 10 left, right or around by use of the driving levers 22, 22.

A mowing switch 23, which turns the mower blades on and off, is at the end of the right driving lever 22. When the mowing switch 23, which is a limit switch, is pressed, the two mower blades start spinning When the mowing switch 23 is pressed again, the two mower blades stop spinning.

A deck support arm 18 is set underneath each chassis 11, and one end of the deck support arm 18 is joined to the bottom side of the chassis 11 in a rotatable way. Another end of the deck support arm 18 is joined to the stay 19a in a rotatable way. The stay 19a is welded to the top of the mower deck 14. Therefore, the deck support arm 18 is joined to the mower deck 14 with the stay 19a. The center of rotation of the deck support arm 18 is its connection point to the chassis 11. The deck support arm 18 is joined to a link mechanism, and the link mechanism is joined to the mower deck lifting lever 24. On the other hand, a stay 19b is welded to the left side of the top of the mower deck 14. The stay 19b is set at the front of the mower deck 14. One end of a shaft S is joined to the stay 19b. Another end of the shaft S is joined to the other stay, and the other stay is welded to the bottom of the main body.

A step ST is for the driver to place his feet when driving the electric lawn mower 10. The step ST is also to be stepped on when the driver is getting on and off the electric lawn mower 10. The step ST is a part of the main cover 20. The main cover 20 covers the chassis 11, 11, and the step ST is located at the front part of the main cover 20. The front end of the step ST tilts up to follow the shape of the chassis 11, which tilts up at the front end. In other words, the surface of the step ST faces the driver's seat 21 at its front end. Therefore, the driver sitting on the driver's seat 21 feels comfortable when he puts his feet on the tilted step ST. A suspension 28 is to absorb the impact from the ground via the front tire 12 (described in more detail later).

Figure 3:
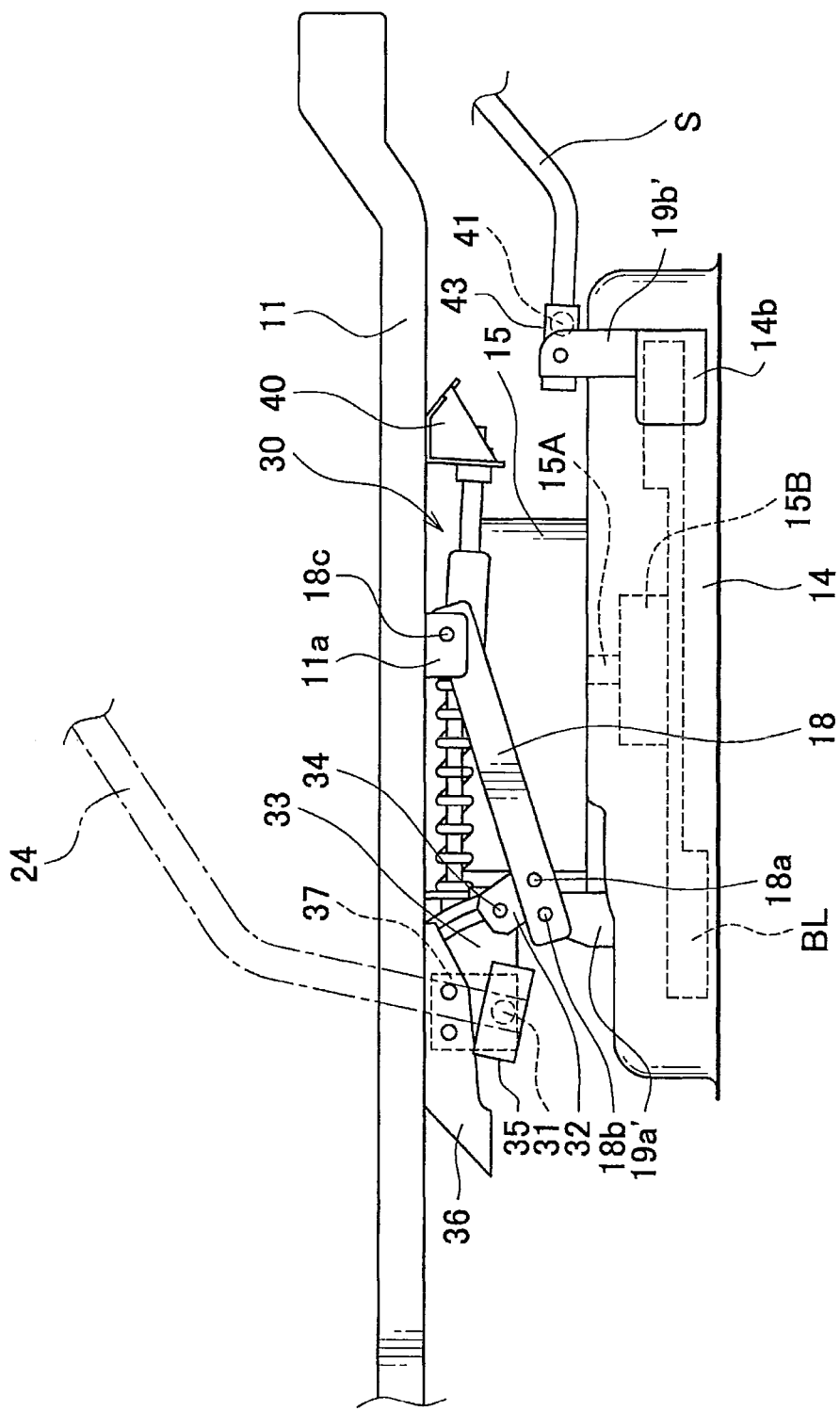
FIG. 3 A close view of FIG. 2.
Figure 4:
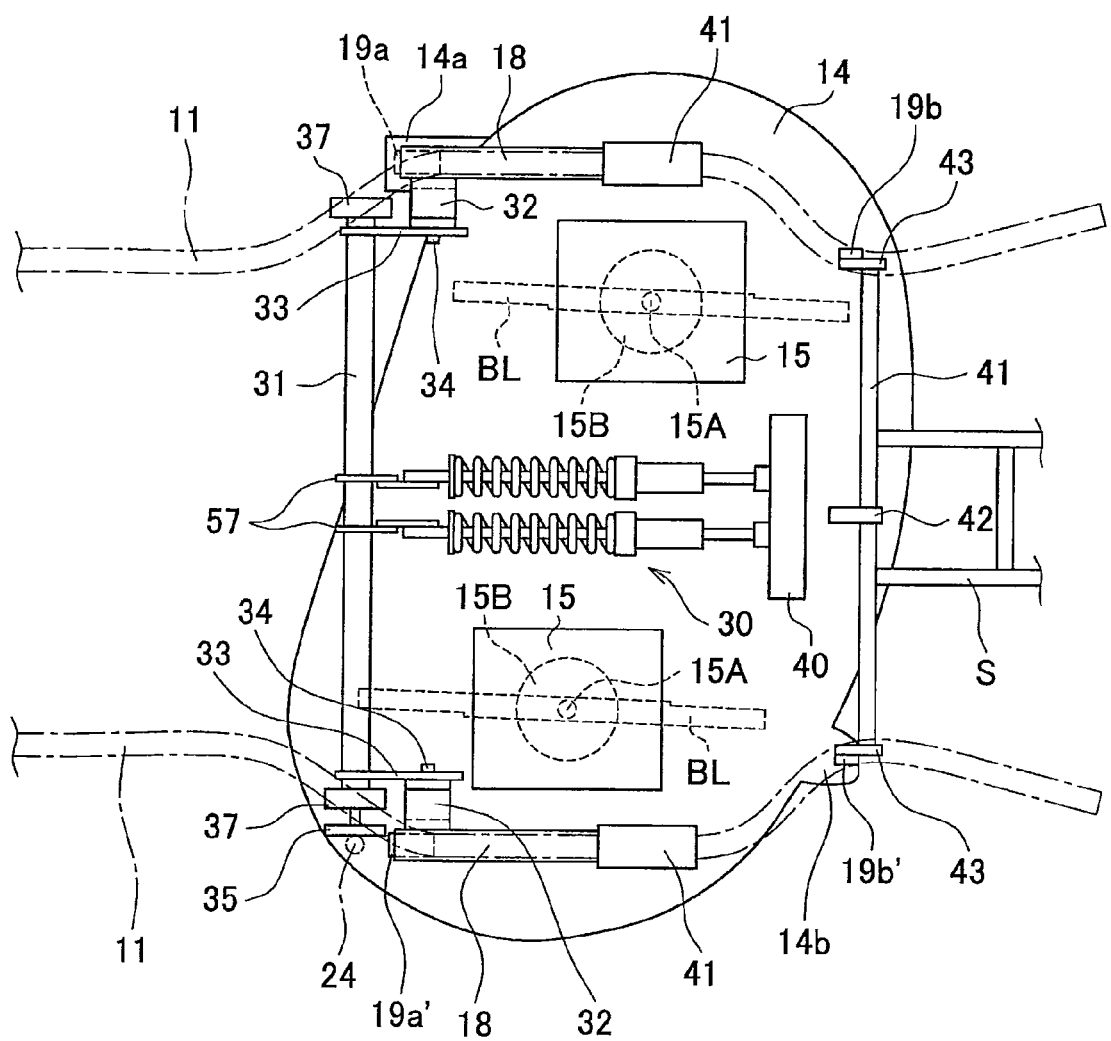
FIG. 4 A plain view of the mower deck.

The main part is shown in FIG. 3 and FIG. 4. The electric lawn mower 10 has a mower deck lifting device, composed of a mower deck lifting lever 24, a lifting shaft 31 and a booster (a boosting means) 30. The booster 30 is set between a bracket 40 and the lifting shaft 31. The bracket 40 consists of an angled metal bar. One of two ribs of the bracket 40 is fixed to a stay, which is fixed to the chassis 11. Another rib of the bracket 40 has two long holes where the end of the booster 30 is held.

The lifting shaft 31 is a bar and is joined to the chassis 11, 11 in a rotatable way. More specifically, two connecting parts 37 are respectively fixed to each end of the lifting shaft 31, which is free to rotate around the connecting part 37. The connecting part 37 (shown in FIG. 6) is fixed to a stay 36 by bolts. The stay 36 is fixed to the chassis 11 by bolts.

A lever plate 35 is fixed at the left end of the lifting shaft 31. The lever plate 35 is to transmit the mechanical power from the mower deck lifting lever 24 to the lifting shaft 31. The lever plate 35 is made by a rectangular plate and is welded to the lower end of the mower deck lifting lever 24 at its center. Then, the lifting shaft 31 is rotated by tilting the mower deck lifting lever 24.

A plate-like lifting arm 33 is fixed at each end of the lifting shaft 31. The lifting aims 33 are set at the inner side of the connecting part 37 along the lifting shaft 31. The lifting arm 33 is a sector with a hole in the center where the lifting shaft 31 is set and welded to. An elongated gap 33a is made near the side opposite the sector center in the lifting arm 33. One end of the pin 34 is set in the elongated gap 33a. Another end of the pin 34 is fixed to a link plate 32. The pin 34 is fixed to one end of the link plate 32 in a rotatable way. Another end of the link plate 32 is fixed to another pin 18a. The pin 18a is fixed to the deck support arm 18. Therefore, the lifting arm 33 is joined to the deck support arm 18 in a rotatable way.

The deck support arm 18 is a frame having a top part and a pair of side parts, which are continuously connected from the top part at its sectional view. The pin 18a penetrates near one end of the deck support arm 18 and is rotatable at this point of the deck support arm 18. A stay 19a' is joined to the deck support arm 18 with a pin 18b at the end of the deck support arm 18. (The stay 19a is fixed on the left side of the top of the mower deck 14 via a deck projection part 14a.) Another end of the deck support arm 18 is fixed to the chassis 11 with a stay 11a. The deck support arm 18 and the stay 11a are joined together with a pin 18c. The deck support arm 18 is rotatable with respect to the stay 11a.

The mower deck 14 is suspended with the stays 19a, 19a', which are fixed to both sides of the back top of the mower deck 14, and the stays 19b, 19b', which are fixed to both sides of the front top of the mower deck 14. In addition to this, the mower deck 14 is also suspended with a stay 42, which is fixed to the middle of the front top of the mower deck 14. Therefore, the lifting arms 33, 33 take the allocated weight of the mower deck 14 through the deck support arm 18. (The mower deck 14 is heavier than a conventional mower deck because the mower deck 14 has two mowing motors 15 on its top as well as two mower blades inside.) The pin 34 is located at the lower end of the elongated gap 33a when the lifting arm 33 suspends the mower deck 14. This is the normal state of the lifting arm 33.

Two plate-like arms 57, 57 are fixed near the middle of the lifting shaft 31. The arm 57 has a teardrop shape, and its wider end has a hole where the lifting shaft 31 penetrates. The arm 57 is welded to the lifting shaft 31. The end of the booster 30 is joined to another end of the two arms 57. The link mechanism is composed of the lifting arm 33, the pin 34 and the link plate 32. The deck support arm 18 is joined to the lift shaft 31. The mechanical power from the booster 30 can be transmitted to the mower deck lifting lever 24. Therefore, the mower deck 14 can be lifted up and down easily.

The stays 19b, 19b' are fixed at the both sides on the mower deck 14 (The deck projection part 14b is located at the right side of the mower deck 14, and the stay 19b' is fixed on the deck projection part 14b.) Another stay 42 is set at the middle of the front top of the mower deck 14. The front part of the mower deck 14 is suspended by a deck support shaft 41 with the stay 19b, the stay 19b' and the stay 42. The stay 42 has a hole where the deck support shaft 41 penetrates in a rotatable way. On the other hand, rectangular connecting plates 43, 43 are fixed at respective ends of the deck support shaft 41. The connecting plate 43 has a hole where a pin joins the connecting plate 43 and the stay 19b (or the stay 19b'). The connecting plate 43 is rotatable around the stay 19b (or the stay 19b').

One end of a pair of shafts S are welded to the middle of the deck support shaft 41 and respective sides of the stay 42. A shaft S' for reinforcing the shafts S, S is set between the two shafts S, S and welded to them. Another end of the two shafts S, S is fixed to the unshown bracket by bolts. The bracket is fixed to the chassis 11 by bolts.

Figure 5:
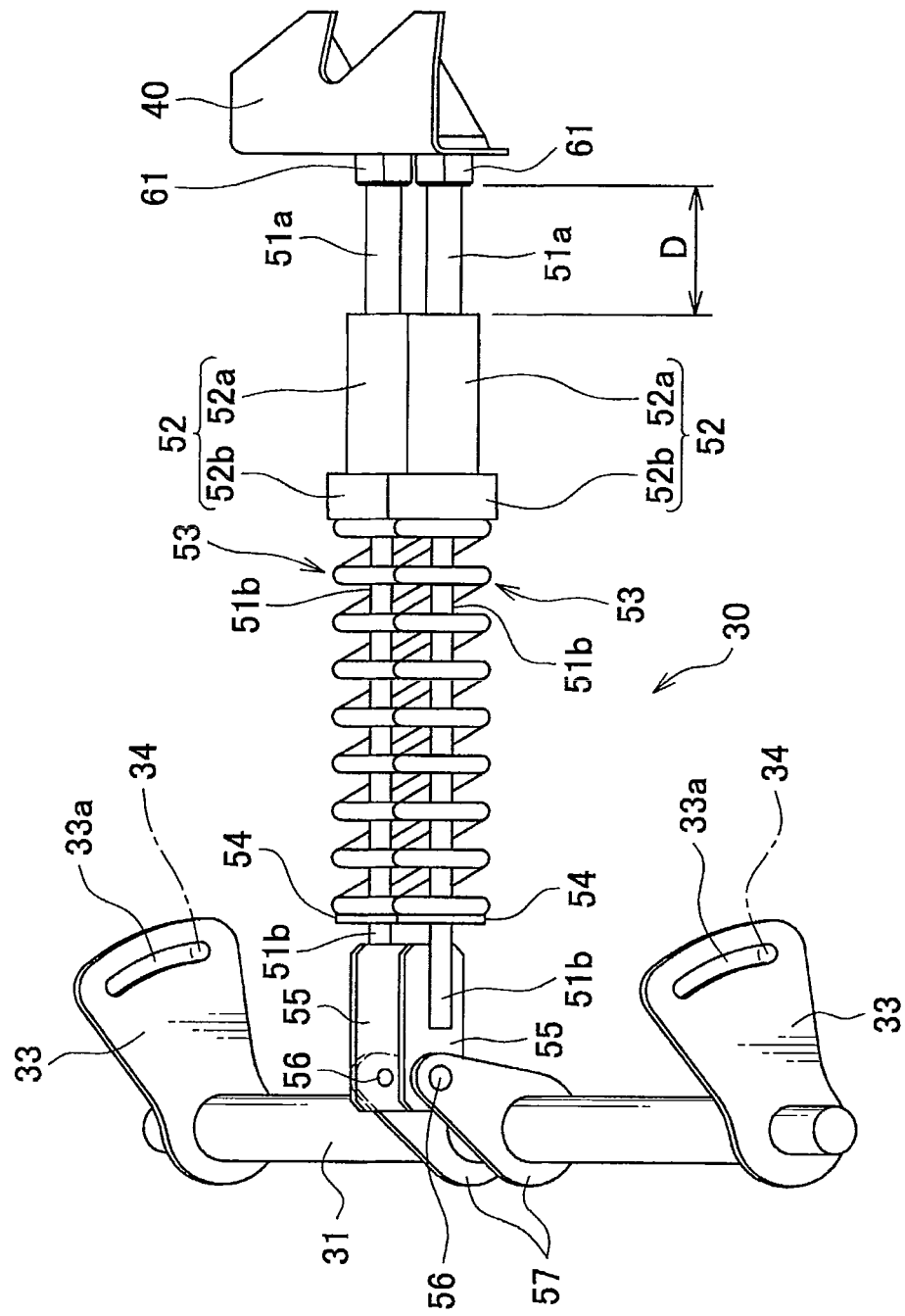
FIG. 5 A perspective view of the mower deck lifting device.
Figure 6:
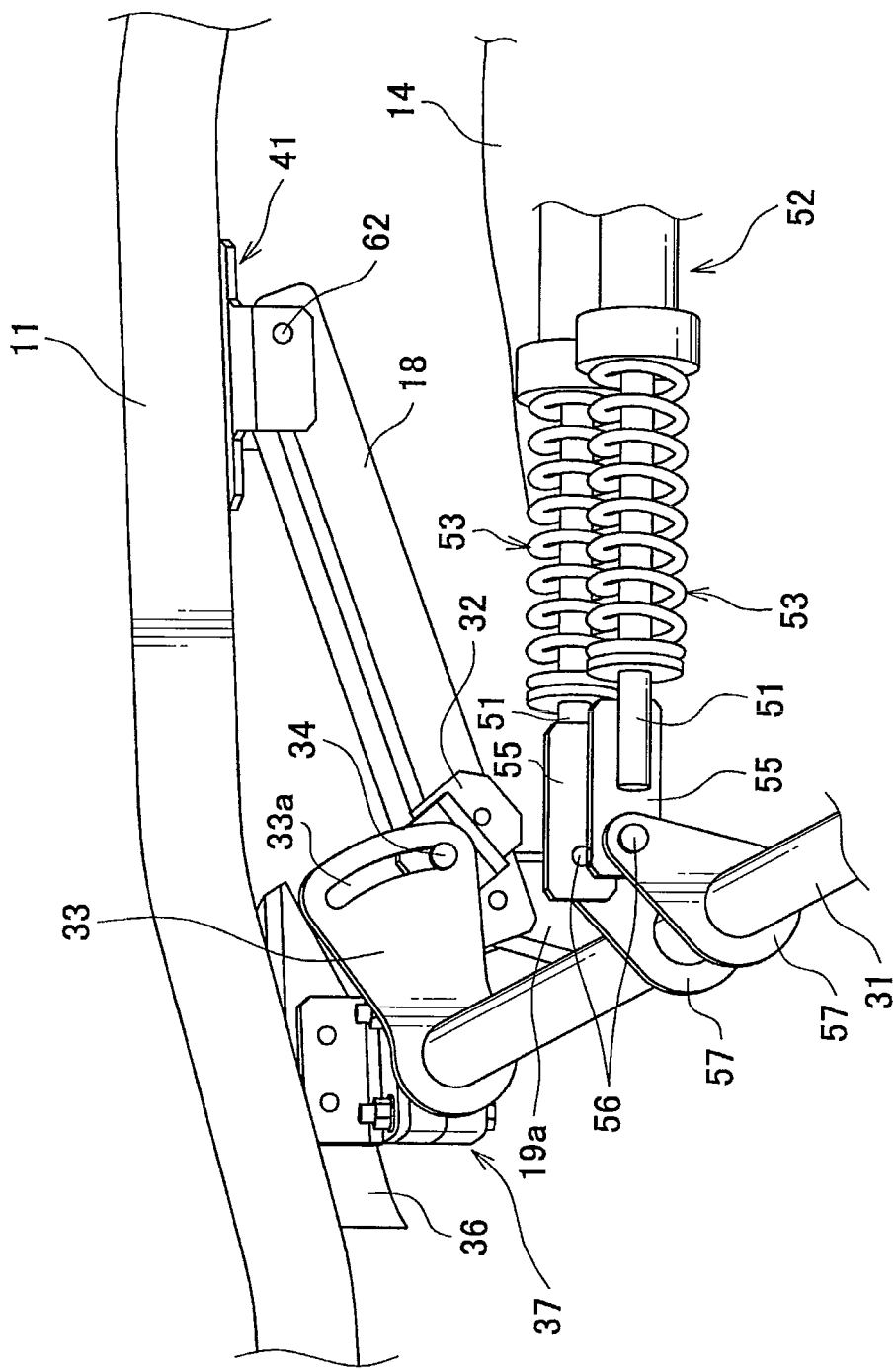
FIG. 6 A perspective view of the mower deck lifting device and chassis.

The structure of the booster 30 is shown in FIG. 5 and FIG. 6. The booster 30 has bar-like spring stays 51a, 51a, which are set side-by-side. The left end of the spring stays 51a, 51a are held by a long hole in the bracket 40. The spring stays 51a, 51a penetrate the bracket 40. A spring power adjustment nut 61 is set on the spring stay 51a so that the spring power adjustment nut 61 attaches to the bracket 40. A male screw for engaging the spring power adjustment nut 61 is located on the spring stay 51a. Therefore, the spring power adjustment nut 61 can be turned on the spring stay 51a to adjust the length D of the spring stay 51a.

A spring support part 52 is fixed at the right end of the spring stay 51a. The spring support part 52 is composed of a cylindrical part 52a and a columnar part 52b. The left end of the spring stay 51a is fixed to the right end of the cylindrical part 52a, and the spring stay 51a is fixed to the cylindrical part 52a. A support part is made in both the columnar part 52b and the cylindrical part 52a. The support part is to be inserted by the left end of the spring stay 51b. The spring stay 51b can be slid in the support part.

The left end of the spring stay 51b is welded on a rectangular joint plate 55. A disk-like spring support part 54 is welded on the spring stay 51b, just off from the joint plate 55. The spring support part 54 has a hole at its center. The spring stay 55b penetrates the hole. The spring support part 54 is welded to the spring stay 55b.

A coil spring (an elastic part) 53 is inserted over the spring stay 51b from the right, then a spring support part 52 is inserted into the spring stay 51b from the left. The top end of the coil spring 53 touches the columnar part 52b of the spring support part 52. The bottom end of the coil spring 53 touches the spring support part 54. The coil spring 53, in a compressed state, is set between the spring support part 52 and the spring support part 54. Therefore, the coil spring 53 presses both the spring support parts 52 and 54 with a certain force. The compression of the coil spring 53 can be changed when the spring stay 51a is moved in and out of the bracket 40 by turning the spring power adjustment nut 61.

The joint plate 55 has a hole at its left end. In addition, the arm 57 has a hole in its narrower end. A pin 56 couples the joint plate 55 with the arm 57 at their respective holes. The joint plate 55 is coupled to the arm 57 so that the joint plate 55 is able to rotate.

Figure 7:
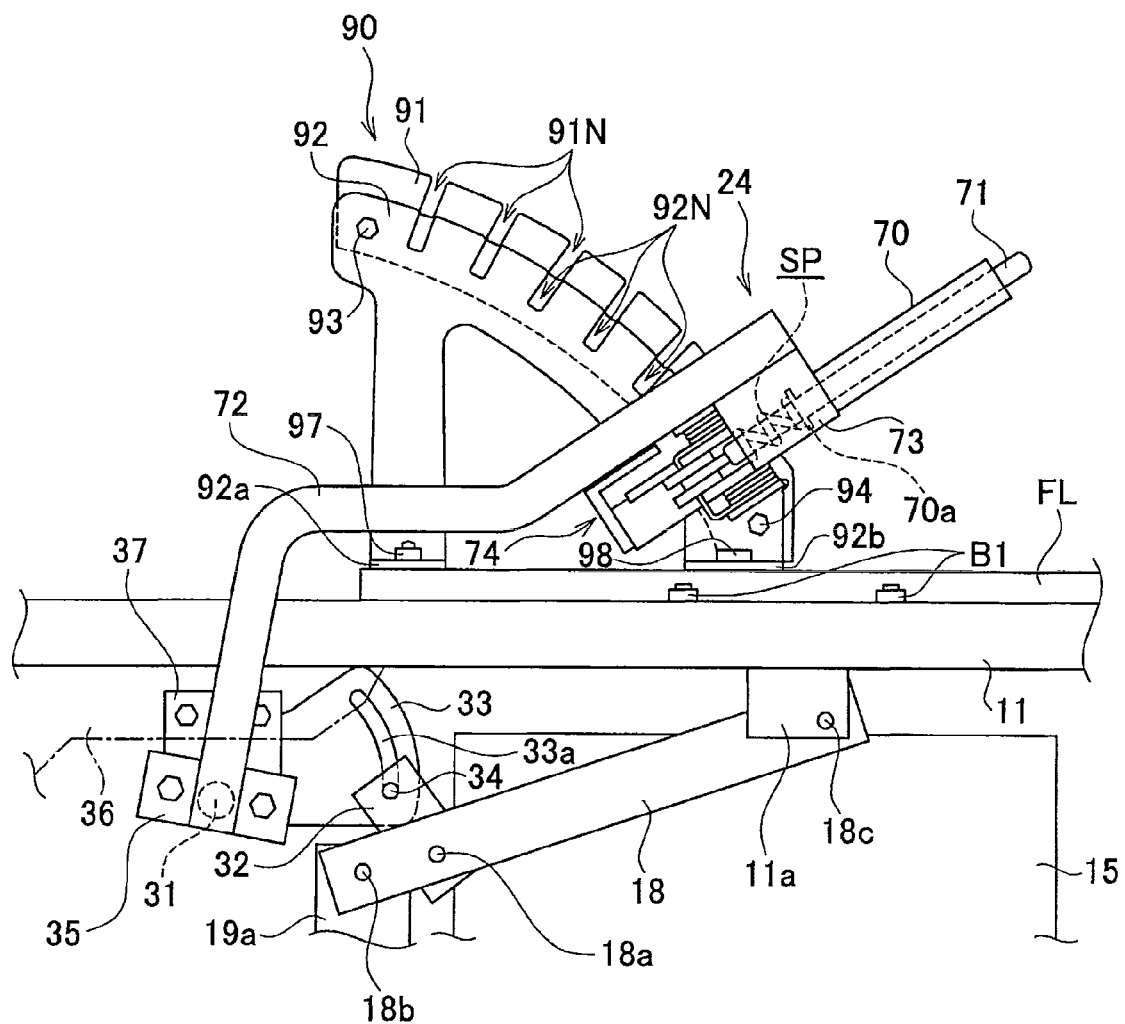
FIG. 7 A side view of the mower deck lifting lever and the mower deck height setting part.

The mower deck lifting lever 24 in FIG. 7 comprises a lever rod 72, a grip (a holding part) 70 and a stop arm case 74. The bottom end of the lever rod 72, as described above, is fixed to the lever plate 35. The upper end of the lever rod 72 is fixed to a connecting part 73 for connecting the grip 70. The connecting part 73 is brick shaped and has a hole in its upper surface. The hole is to fix the bottom end of the grip 70. One of sides of the connecting part 73 is welded to the top end of the lever rod 72.

The grip 70 has a bamboo-like shape with an anti-slip rubber on its outer surface. A lock release rod (a release means) 71 is set inside the grip 70. The lock release rod 71 goes down through the connecting part 73. The stop arm case 74 is set underneath the connecting part 73. The stop arm case 74 is fixed to a setting plate 76, and the setting plate 76 is fixed to the upper part of the lever rod 72. The mower deck lifting lever 24 can rotate around the lifting shaft 31.

The lock release rod 71 has a ring-like projection 70a in the connecting part 73. A coil spring SP is set at the center of the lock release rod 71, and the upper end of the coil spring SP touches the projection 70a. The lower end of the coil spring SP is supported by a supporting part in the connecting part 73. Therefore, the lock release rod 71 is pressed upward by the coil spring SP.

As described later, the stop arm case 74 has two stop arms (lock plates), which are different in length. These stop arms are to engage a notch 91N of a guide plate 91, and a notch 92N of a guide plate 92 in a mower deck height setting part 90. The mower deck lifting lever 24 can be locked at the target position when one arm is engaged with the notch 91N or the other arm is engaged with the notch 92N. The height of the mower deck 14 is set when the mower deck lifting lever 24 is locked.

The mower deck height setting part 90 is next to the mower deck lifting lever 24. In addition, the mower deck height setting part 90 is set in the direction in which the mower deck lifting lever 24 is moving. The mower deck height setting part 90 is fixed on a driving floor FL by two connecting plates 92a, 92b. The mower deck height setting part 90 is fixed on a driving floor FL by bolts 97, 98. (The driving floor FL is fixed on the chassis 11 by bolts B1.)

Figure 8A:
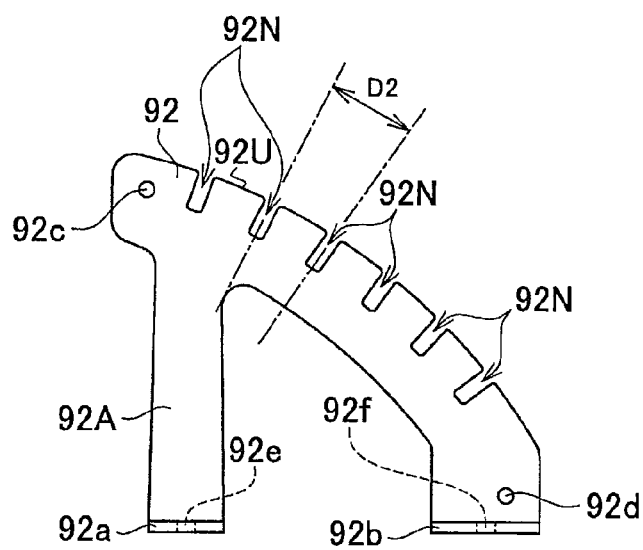
FIG. 8A is a side view of one of two guide plates.
Figure 8B:
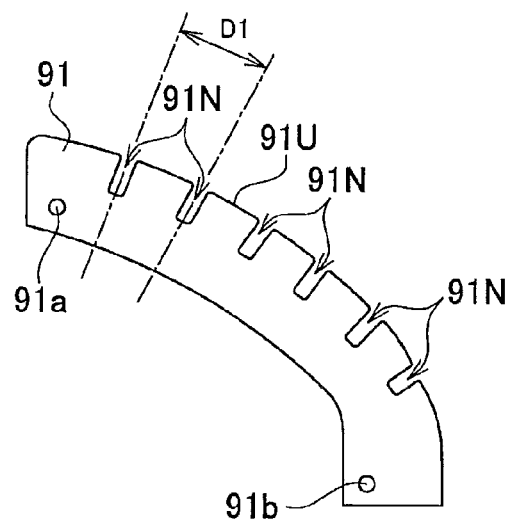
FIG. 8B is a side view of another guide plate.
Figure 8C:
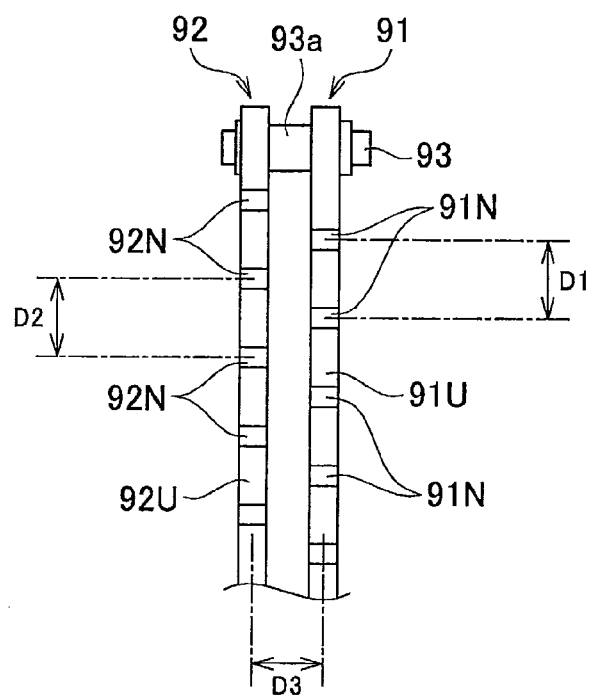
FIG. 8C is a close plain view when the two guide plates are installed.
Figure 9:
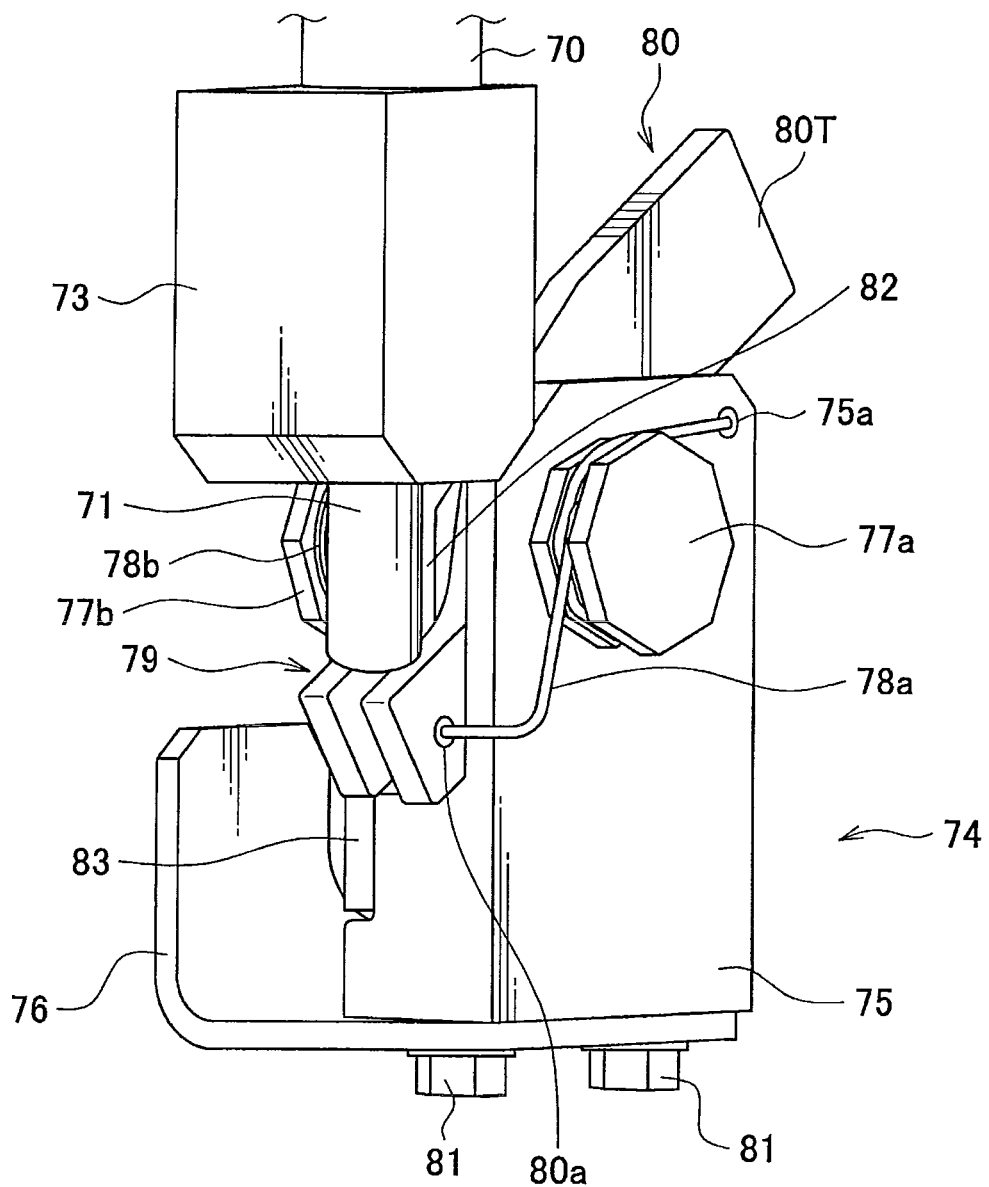
FIG. 9 A right back perspective view of the stop arm case.
Figure 10:
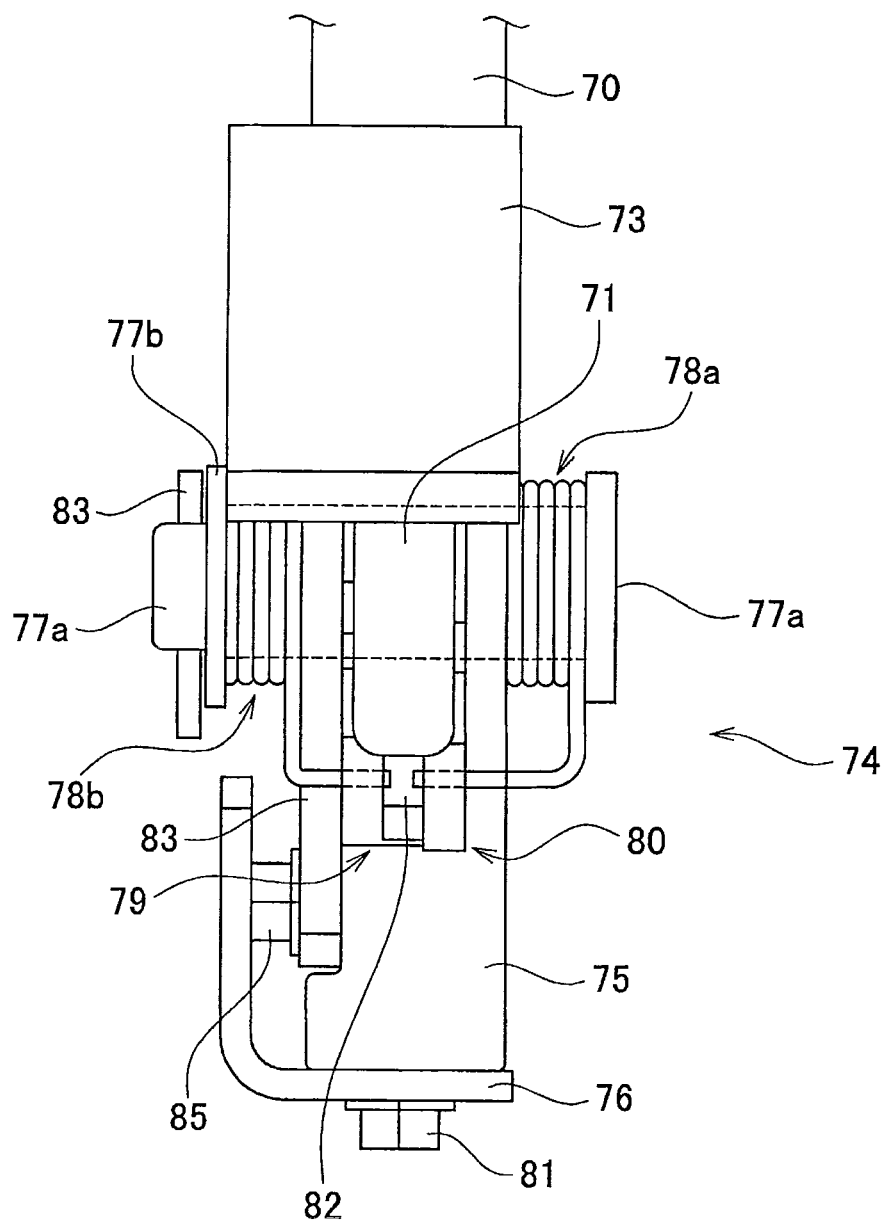
FIG. 10 A back view of the stop arm case.
Figure 11:
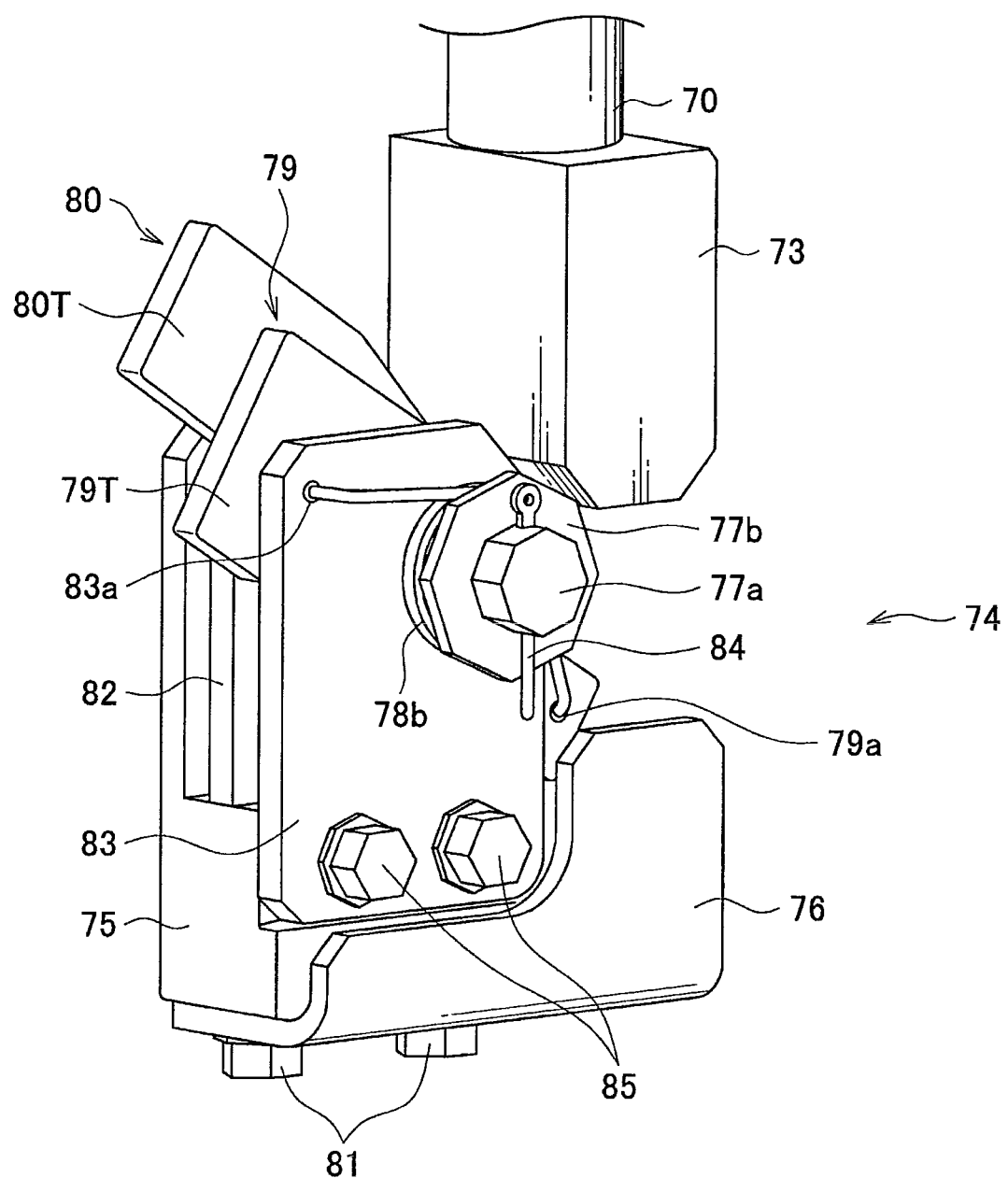
FIG. 11 A left front perspective view of the stop arm case.
Figure 12:
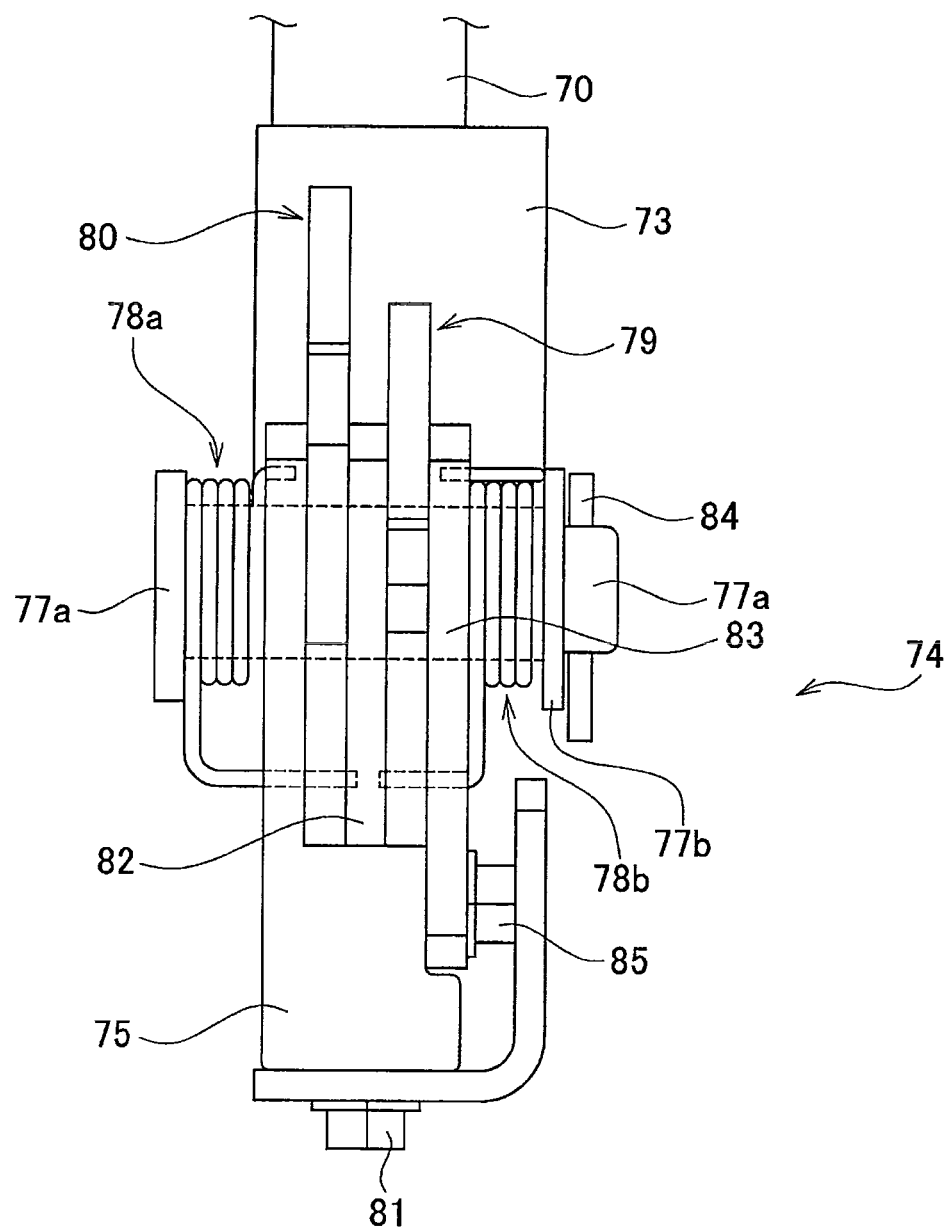
FIG. 12 A front view of the stop arm case.

As shown in FIG. 8, the guide plate 91 is a metal plate shaped approximately like a half arch with a certain width. Holes 91a, 91b are made at both ends of the guide plate 91 while six notches 91N are made in the pitch D1 at the top end of the guide plate 91. On the other hand, the guide plate 92 is made of a metal plate shaped approximately like a half arch with a certain width. Holes 92c, 92d are made at both ends of the guide plate 92. In addition, six notches 91N are made in the pitch D2 at the top end of the guide plate 92. A leg part 92A, which is a part of the guide plate 92, is formed down from the position of hole 92c of the guide plate 92. The leg part 92A is bent into an L shape at its lower part and, consequently, a connecting part 92a is formed. A hole 92e is made at the center of the connecting part 92a. A connecting part 92b is formed down from the position of hole 92d of the guide plate 92. The connecting part 92b is bent into an L shape and is a part of the guide plate 92. A hole 92f is made at the center of connecting part 92b.

A bolt 93 is put in the holes 91a and 92c where the two holes 91a and 92c meet. In addition, a bolt 94 is put in the holes 91b and 92d where the two holes 91b and 92d meet. As a result, the guide plate 91 is joined to the guide plate 92. To make a space, a spacer 93a is set between the two guide plates 91 and 92. The two guide plates 91 and 92 are vertically staggered.

It is acceptable for the pitch D1 between the notches 91N and the pitch D2 between the notches 92N to be different or to be the same. In any case, the guide plate 91 should be joined to the guide plate 92 so that the two guide plates 91 and 92 are vertically staggered. In addition, the number of notches 91N and notches 92N does not have to be six. It can be more than six or less than six. The larger the number of notches, the smaller the pitches D1 and D2 can be set.

The detail of the stop aim case 74 is shown in FIG. 9 to FIG. 12. The stop arm case 74 is composed of an arm support part 75, a stop arm (a lock plate) 80, an arm spacer 82, a stop arm (a lock plate) 79 and a back plate 83 consecutively. Each of these parts has a hole for a bolt 77a. A coil spring 78a is joined at the outer surface of the arm support part 75. A coil spring 78b is joined at the outer surface of the back plate 83. The bolt 77a is inserted in the coil spring 78a from the outside. A washer 77b is put on the coil spring 78b from the outside. Then, a pin 84 is hooked on the end of the bolt 77a. The lower part of the back plate 83 is joined to the lower part of the arm support part 75 by bolts 85. A connecting plate 76 is joined to the bottom end of the arm support part 75 by bolts 81. The stop arm case 74 is joined to the connecting plate 76 by bolts. The connecting plate 76 is joined to the lever rod 72 by bolts.

The arm support part 75 has a hole 75a, and the stop arm 80 has a hole 80a. Both hole 75a and hole 80a are for fixing the end of a coil spring 78a. The top 80T of the stop arm 80 is forced to turn downward by the coil spring 78a. The stop arm 79 has a hole 79a, and the back plate 83 has a hole 83a. Both hole 79a and hole 83a are for fixing the end of a coil spring 78b. The top end 79T of the stop arm 79 is forced to turn downward by the coil spring 78b. In FIG. 9 to FIG. 12, the lower end of the lock release rod 71 should press the two stop arms 79, 80 from the above, then the stop arms 79, 80 turn upward.

The upper edge of the arm support part 75, the arm spacer 82 and the back plate 83 are cut so that the three parts can form one surface. The connecting part 73 is fixed to this cut edge so that the lock release rod 71 of the connecting part 73 can touch the stop arms 79, 80.

Figure 13A:
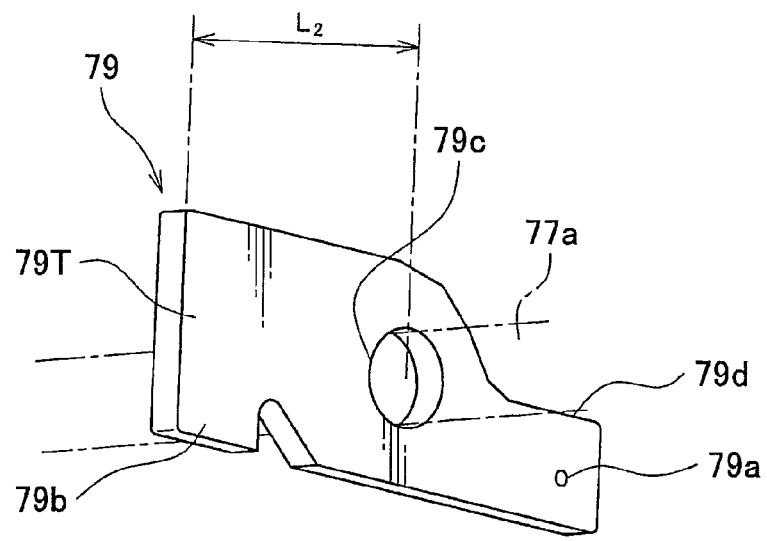
FIG. 13A and FIG. 13B Perspective views of two stop arms in the stop arm case.
Figure 13B:
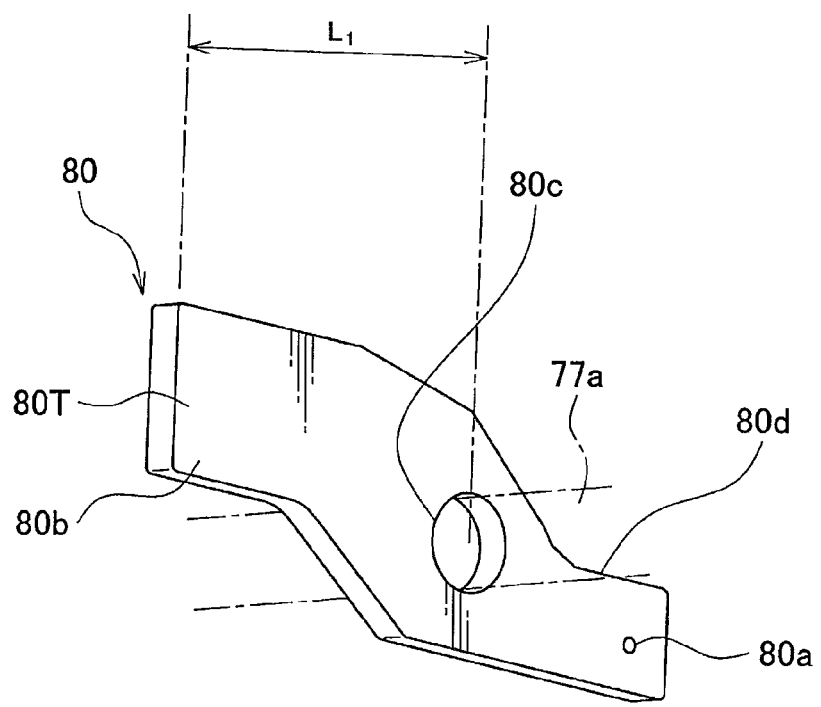

The detail of the stop arms 79, 80 is shown in FIG. 13. The stop arm 79 is a metal plate that can reach to the guide plate 92. The stop arm 79 has a hole 79c for the bolt 77a at its center. The flat surface 79d is formed at the upper side of the back end of the stop arm 79. The lower side 79b of the front end of the stop arm 79 is flat so that the lower side 79b can engage the notch 82N. The stop arm 80 is a metal plate, and can reach to the guide plate 91. The stop arm 80 has a hole 80c for the bolt 77a at its center. The flat surface 80d is formed at the upper side of the back end of both the stop arms 80. The lower side 80b of the front end of the stop arm 80 is flat so that the lower side 80b can engage the notch 81N.

The guide plate 92 is set nearer the mower deck lifting leaver 24 than the guide plate 91. Therefore, the length L2 between the hole 79c and the top end 79T of the stop arm 79 is shorter than the length L1 between the hole 80c and the top end 80T of the stop arm 80.

The flat surfaces 79d and 80d touch the lock release rod 71. Therefore, it is preferable that the length of the flat surface 79d is equal to the length of the flat surface 80d. In addition to this, it is preferable that the distance between the hole 79c and the back end of the stop arm 79 is equal to the distance between the hole 80c and the back end of the stop arm 80.

Figure 14A:
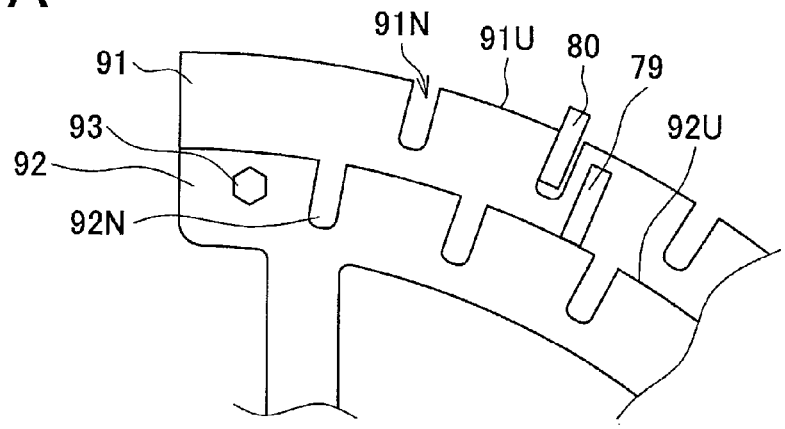
FIG. 14A, FIG. 14B and FIG. 14C The procedure of how to set the height of the mower deck by use of the mower deck lifting lever.

Here, it is explained how to lift the mower deck 14 of the electric ride-on mower 10. In FIG. 14A, the stop arm 80 is engaging the notch 91N. The stop arm 79 is not engaging the notch 92N, and the lower end 79b is touching the upper side 92U of the guide plate 92.

Figure 14B:
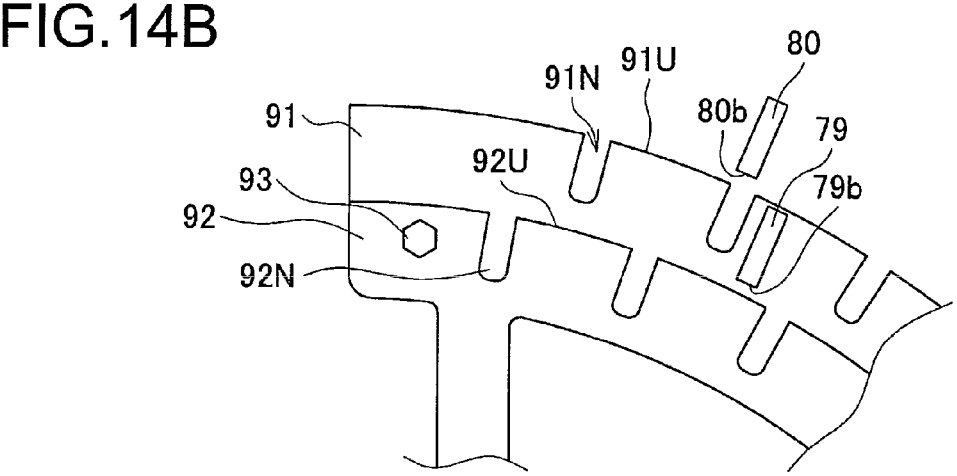

Then, hold the grip 70 of the mower deck lifting lever 24 with the right hand and press the top of the lock release rod 71. The bottom end of the lock release rod 71 touches and pushes downward both the flat surface 79d of the stop arm 79 and the flat surface 80d of the stop arm 80. As shown in FIG. 14B, the stop arm 79 turns against the tension of the coil spring 78a, and the stop arm 80 turns against the tension of the coil spring 78b. The top ends 79T and 80T move up. The lower end 79b of the stop arm 79 moves upward from the upper end 92U of the guide plate 92. The lower end 80b of the stop arm 80 moves out upwardly from the notch 91N and is put on the upper edge 91U of the guide plate 91.

Figure 14C:
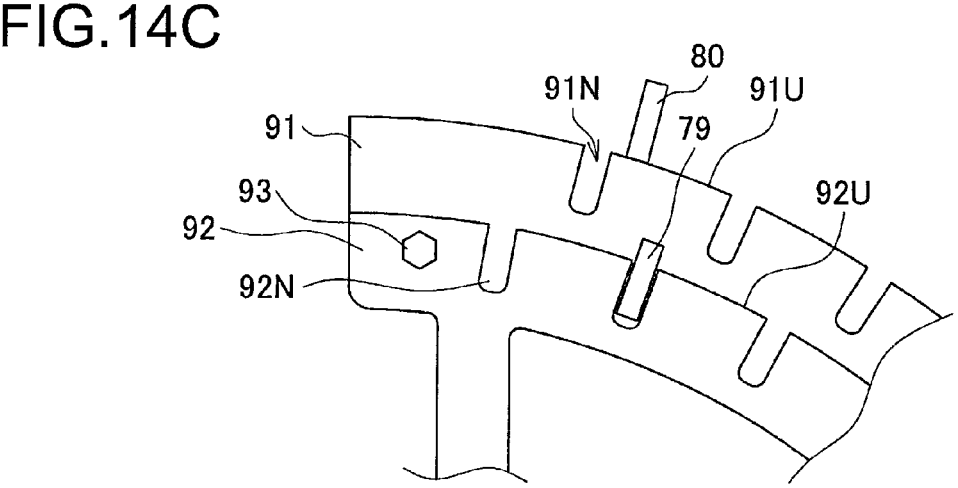

Turn the mower deck lifting lever 24 anti-clockwise, as shown in FIG. 7, and release the right hand from the lock release rod 71. Then, the stop arm 79 slides on the upper edge 91U of the guide plate 91. The stop arm 80 slides on the upper edge 92U of the guide plate 92. The mower deck lifting lever 24 is locked when either the stop arm 79 or the stop arm 80 engages the nearest notch 91N or 92N (FIG. 14C). The driver can release his hand from the grip 70 at this stage.

The lifting shaft 31 turns anti-clockwise when the mower deck lifting lever 24 is turned anti-clockwise, as shown in FIG. 7. Lifting arms 33, 33, which are set at both sides of the lifting shaft 31, turn upward and move the deck support arms 18, 18 upward. When the deck support aim 18 is moved up, the stay 19a', which is fixed on the deck support arm 18, is also moved upward. Consequently, the mower deck 14 is moved upwards by the deck support arms 18, 18.

When decreasing the height of the mower deck 14, press the lock release rod 71. Then, the bottom end of the lock release rod 71 touches the flat surface 79d of the stop arm 79 and the flat surface 80d of the stop arm 80, and pushes the flat surface 79d, 80d downward. The stop arm 79 rotates against the tension of the coil spring 78a, and the stop arm 80 rotates against the tension of the coil spring 78b. The top ends 79T, 80T of both stop arms 79, 80 are moving up. The bottom end 79b of the stop arm 79 leaves the upper edge 92U of the guide plate 92. On the other hand, the bottom end 80b of the stop arm 80 leaves the notch 91N and stays above the upper edge 91U of the guide plate 91.

Then, turn the mower deck lifting lever 24 clockwise as shown in FIG. 7, and release the hand from the lock release rod 71. The stop arm 79 touches and slides on the upper edge 91U of the guide plate 91 whereas the stop arm 80 touches and slides on the upper edge 92U of the guide plate 92. When either the stop arm 79 or the stop arm 80 first engages the nearest one of the notches 91N or the notches 92N, the mower deck lifting lever 24 is locked. Then, release the hand from the grip 70.

When the mower deck lifting lever 24 turns clockwise, as shown in FIG. 7, the lift shaft 31 turns clockwise. The lifting arms 33, 33, which are fixed at both ends of the lifting shaft 31, turn clockwise, and the end of the deck support arm 18 moves down. When the deck support aim 18 moves down, the stay 19', which is fixed at the end of the deck support arm 18, is also moved down, and the mower deck 14 moves down.

Although the two guide plates 91, 92 are set in this embodiment, this invention is not limited by this embodiment. More than two guide plates can be set in the electric ride-on mower of this invention. In addition, the specific stop arm can be set for each guide plate.

Furthermore, the mower deck 14, which equips two mowing motors 15, is much heavier than the conventional lawn mower deck powered by an engine because it has two mowing motors 15 on it. Therefore, the mechanical power on the stop arms 79, 80 and the guide plates 91, 92 will be much heavier than those of a conventional lawn mower. Considering this fact, the guide plate should be reinforced by making the plate thicker to keep the pitch of notches the same as that of a conventional lawn mower. It is not necessary to do so if two guide plates are introduced as shown in this embodiment, and the pitch of notches of each guide plate can be wider.

The mower deck 14 is suspended by the lifting arm 33 with the pin 34 at the bottom end of the long gap 33a. If some obstacle on the ground hits the mower deck 14, then the mower deck 14 can be moved upward within the distance of the long gap 33a and the impact from the ground on the mower deck 14 can be absorbed.

Figure 15A:
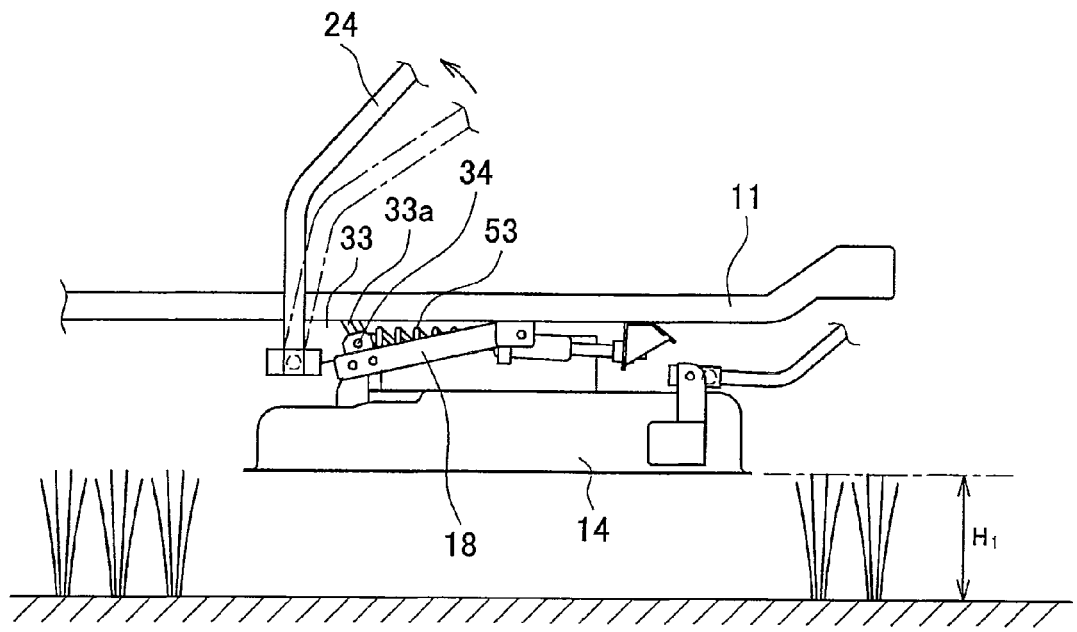
FIG. 15A The side view of before lifting up the mower deck, and FIG. 15B The plain view of before lifting up the mower deck.
Figure 15B:
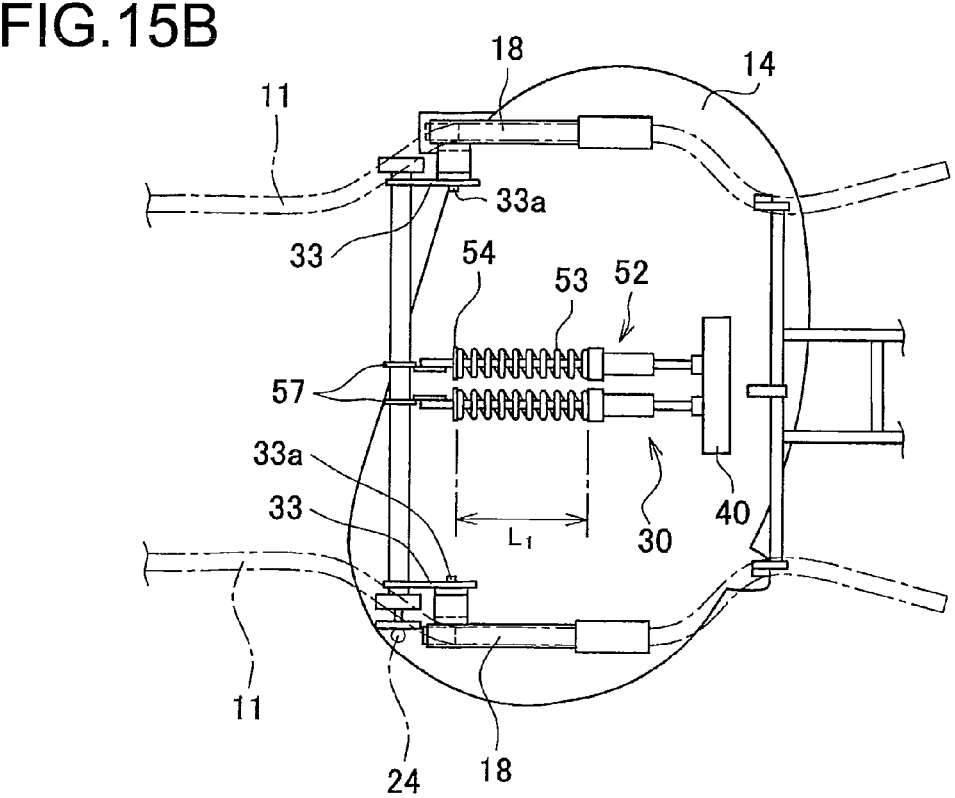
FIG. 15 Figures showing how to lift the mower deck of the electric ride-on mower.
Figure 16A:
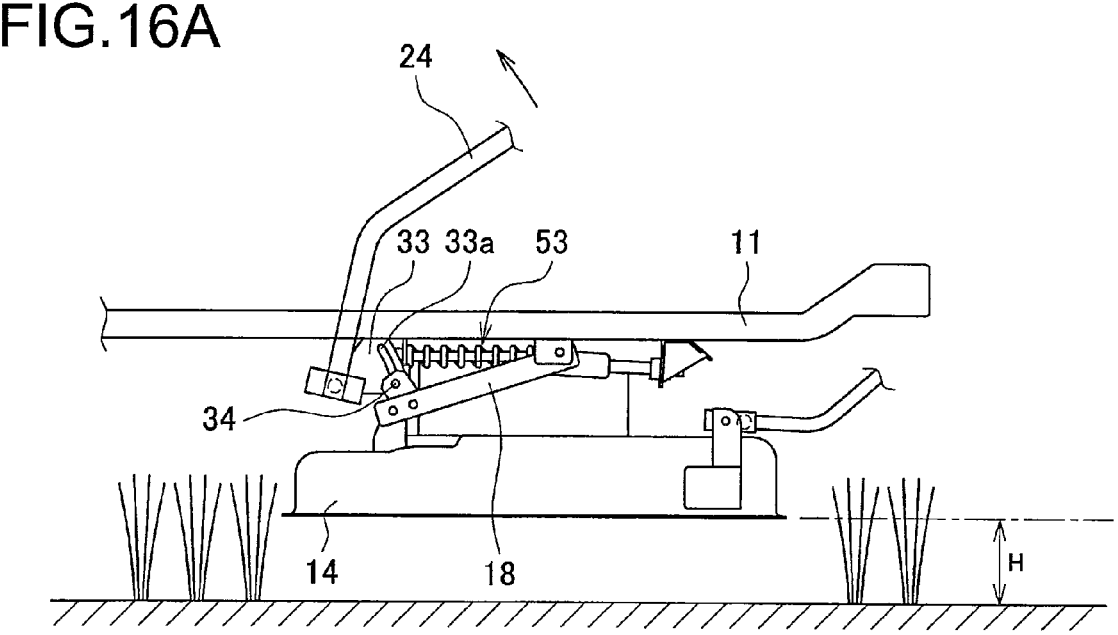
FIG. 16A The side view, and FIG. 16B The plain view.
Figure 16B:
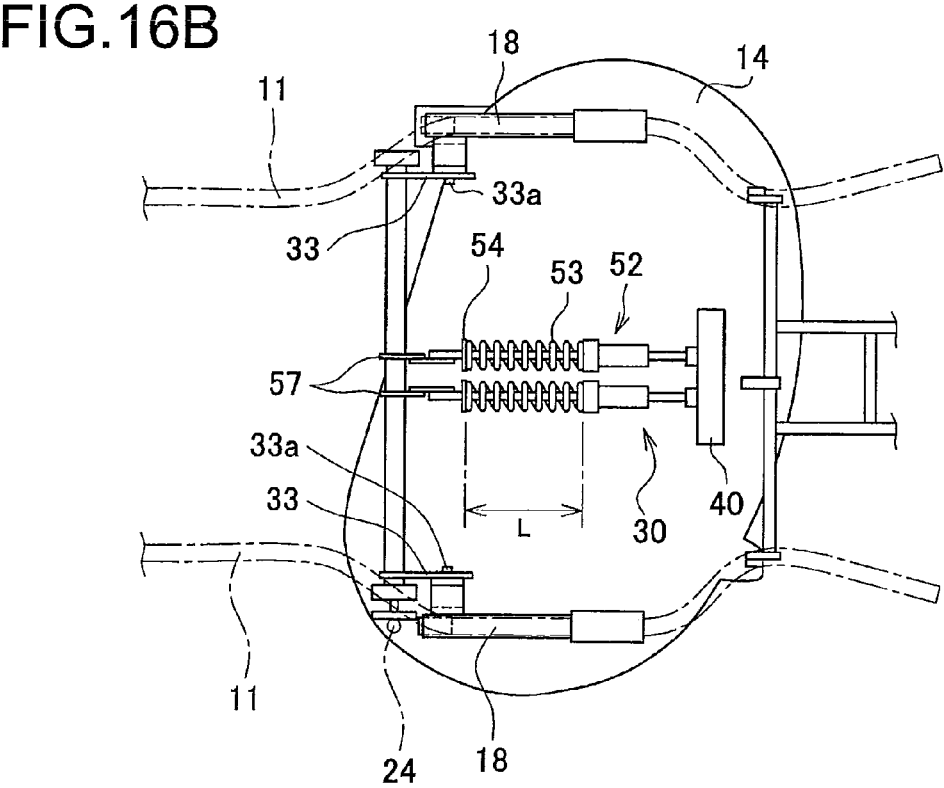
FIG. 16 Figures showing the mower deck lifting up from FIG. 15.

The operation procedure of the mower deck 14 of the electric ride-on mower 10 is as follows. FIG. 15 and FIG. 16, in addition to FIG. 1 to FIG. 14, are used for this explanation. The coil spring 53 has a length L when the mower deck 14 has a height H (FIG. 15). In order to elevate the mower deck 14 to a height H1 (H1>H), hold the grip 70 of the mower deck lifting lever 24 and press the top of the lock release rod 71. Then, both of the stop arms 79, 80 turn, and the stop arm 79 or the stop arm 80 leaves the notch 91N or the notch 92N. Keep the lock release rod 71 pressed and turn the mower deck lifting lever 24 anti-clockwise (FIG. 15A). The lift shaft 31 turns anti-clockwise, and then, the arm 57 turns. When the arm 57 turns anti-clockwise, the spring stay 51b is pulled towards the left by the arm 57. At this stage, the coil spring 53 is extending. The coil support part 54 at the spring stay 51b is pressed in such a way that the coil support part 54 goes away from the coil spring 53. Therefore, the lifting shaft 31 is turned easily by use of the tension of the coil spring 53. The mower deck 14 can be moved upward easily.

When the mower deck 14 reaches the targeted height H1, stop turning the mower lifting lever 24 and remove the hand from the lock release rod 71. Then, either the stop arm 79 or the stop arm 80 engages the nearest notch, either the notch 91N or the notch 92N, and the mower deck lifting lever 24 is locked. The coil spring 53 extends to the length L1 (L1>L) at this stage.

As described above, the mower deck 14 is suspended by the lifting arms 33, 33 with the pin 34 being at the bottom end of the long gap 33a. Therefore, if some obstacle hits the mower deck 14 from the ground, the mower deck 14 can be moved upward within the distance of the elongated gap 33a and the impact from the ground on the mower deck 14 can be absorbed.

As the length D of the spring stay 51a can be changed by turning the spring stay 51 a, the length of the coil spring 53 can also be changed. Assisting power for turning the lifting arm 33 and the lifting shaft 31 (boosting strength) can be changed. In other words, the assisting power for turning the mower deck lifting lever 24 can be changed.

The coil spring 53 of the booster 30 is used for creating the assisting power. However, the coil spring 53 is not the only means for assisting power in this invention. Any elastic body can be used instead of the coil spring 53. The mower deck height setting part 90 does not always have the two guide plates 91, 92. The mower deck height setting part 90 can have one guide plate, or more than two guide plates. If the mower deck height setting part 90 has more than two guide plates, at the side view, the spacing (the pitch) of the notches for the stop arms can be closer. Therefore, the mower deck can be adjusted to various heights.

Further Embodiment 1

Figure 17A:
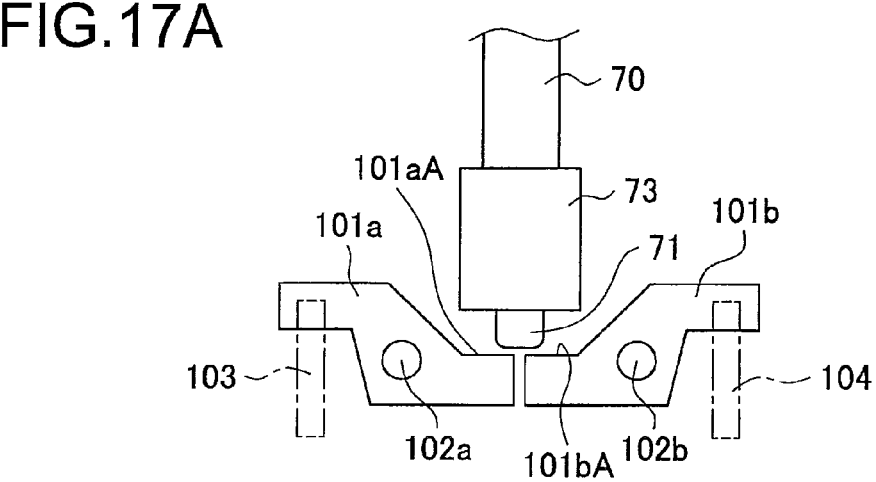
FIG. 17A A plain view of a further embodiment of the stop aim, FIG. 17B and FIG. 17C Figures showing the procedure of working the stop arm.

The further embodiment is shown in FIG. 17A. In this embodiment, two identical stop arms (lock plates) 101a and 101b, are made. In doing so, the manufacturing process can be simplified and the manufacturing cost reduced. In this embodiment, a guide plate 103 is set on one side of the turning direction of the mower deck lifting lever 24 whereas a guide plate 104 is set on the other side of the turning direction of the mower deck lifting lever 24. (The two guide plates 103, 104 have leg parts.) Therefore, a rotating axis 102a of the stop arm 101a and a rotating axis 102b of the stop arm 101b are not set in one line. The stop arm 101a and the stop arm 101b are set so that the lock release rod 71 can touch the two flat plane parts 101aA, 101bA simultaneously. The pitch of the notch 103N and the pitch of the notch 104N can be either the same or different. When the pitch of the notch 103N and the pitch of the notch 104N are the same, it is necessary to set the two guide plates 103, 104 so that the notches 103N do not match each other in the side view. Other components are the same as the previous embodiment.

To move the mower deck 14 up in this embodiment, hold the grip 70 of the mower deck lifting lever 24 with the right hand and press the top of the lock-release rod 71. The bottom of the lock release rod 71 touches and pushes downward both the flat surface of 101aA of the stop arm 101a and the flat surface 101bA of the stop arm 101b. The stop arm 101a rotates against the tension of the coil spring 78a, and the stop arm 101b rotates against the tension of the coil spring 78b. The front ends of the stop arms 101a, 101b both move up.

Figure 17B:
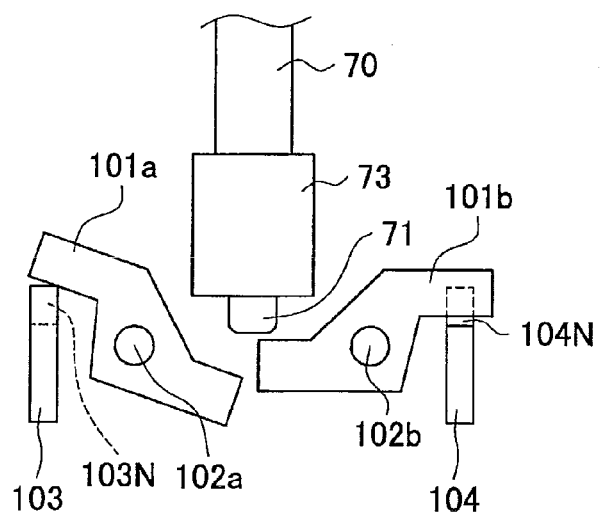
Figure 17C:
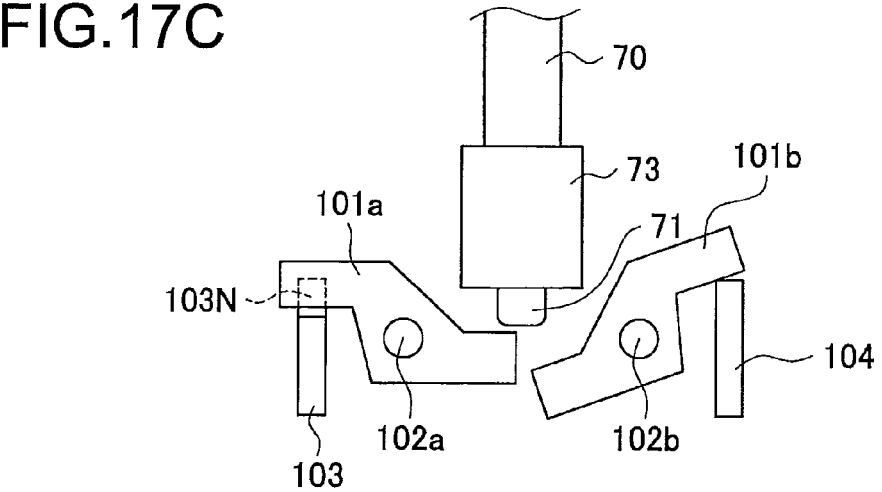

Turn the mower deck lifting lever 24 anti-clockwise, as shown in FIG. 7, and release the right hand from the lock release rod 71. Then, the stop arm 101a slides on the upper edge of the guide plate 103. The stop arm 101b slides on the upper edge of the guide plate 104. The mower deck lifting lever 24 is locked when either the stop arm 101a (FIG. 17C)

or the stop arm 101*b* (FIG. 17B) engages the nearest notch 103N or 104N. The driver can release his hand from the grip 70 at this stage.

The lifting shaft 31 turns anti-clockwise when the mower deck lifting lever 24 is turned anti-clockwise, as shown in FIG. 7. The lifting arms 33, 33 turn upward and move the deck support arms 18, 18 upward. When the deck support arm 18 is moved up, the stay 19*a'*, which is fixed on the deck support arm 18, is also moved upward. Consequently, the mower deck 14 is moved up by the deck support arms 18, 18.

When downing the height of the mower deck 14, press the lock release rod 71. Then, the bottom end of the lock release rod 71 touches the flat surface 101*a*A of the stop arm 101*a* and the flat surface 101*b*A of the stop arm 101*b*, and pushes the flat surfaces 101*a*A, 101*b*A downward. The stop arm 101*a* rotates against the tension of the coil spring 101*a*A, and the stop arm 101*b* rotates against the tension of the coil spring 101*b*A. Front ends of both stop arms 101*a*, 101*b* move up.

Then, turn the mower deck lifting lever 24 clockwise as shown in FIG. 7, and remove the hand from the lock release rod 71. The stop arm 101*a* touches and slides on the upper edge of the guide plate 103 whereas the stop arm 101*b* touches and slides on the upper edge of the guide plate 104. When either the stop arm 101*a* (FIG. 17C) or the stop arm 101*b* (FIG. 17B) first engage the nearest one of the notches 91N or the notches 92N, the mower deck lifting lever 24 is locked. Then, release the hand from the grip 70.

When the mower deck lifting lever 24 turns clockwise, as shown in FIG. 7, the lifting shaft 31 turns clockwise. The lifting arms 33, 33, which are fixed at both ends of the lifting shaft 31, turn clockwise, and the end of the deck support arm 18 moves down. When the deck support arm 18 moves down, the stay 19', which is fixed at the end of the deck support arm 18, is also moved down, and the mower deck 14 moves down.

Figure 18:
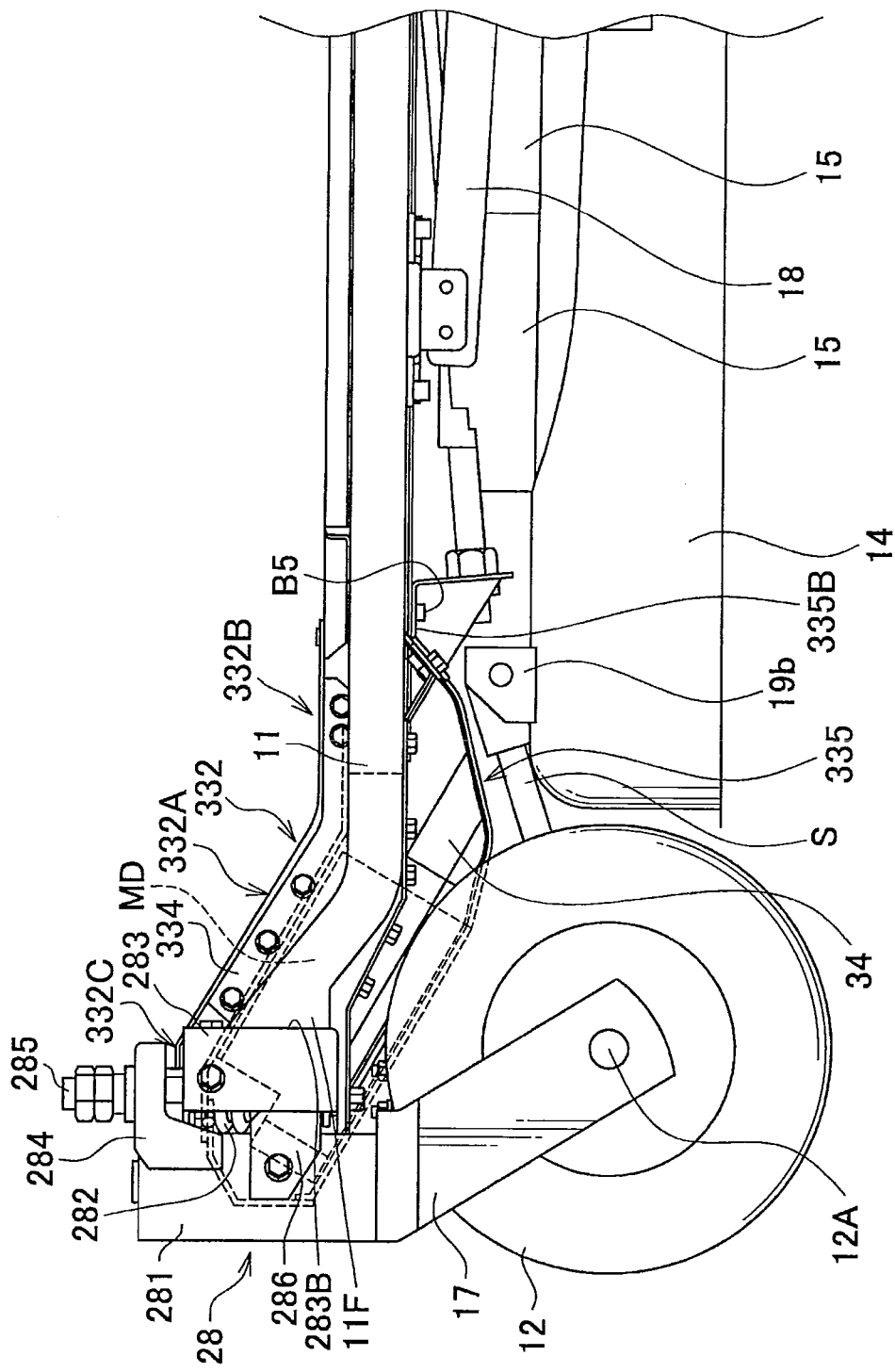
FIG. 18 A side close view of the front part of this embodiment of the electric ride-on mower.
Figure 19:
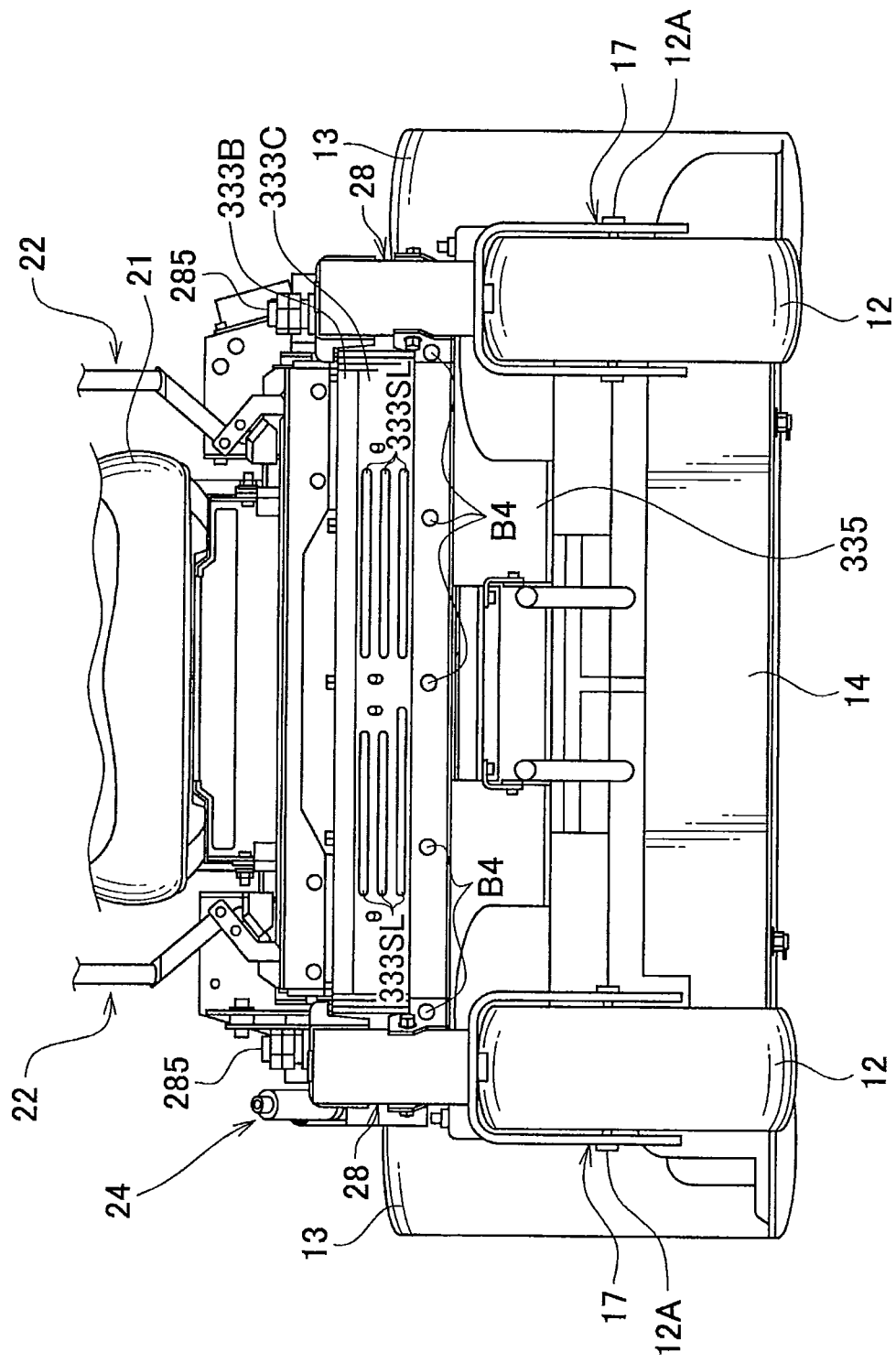
FIG. 19 A front view of this embodiment of the electric ride-on mower.
Figure 20:
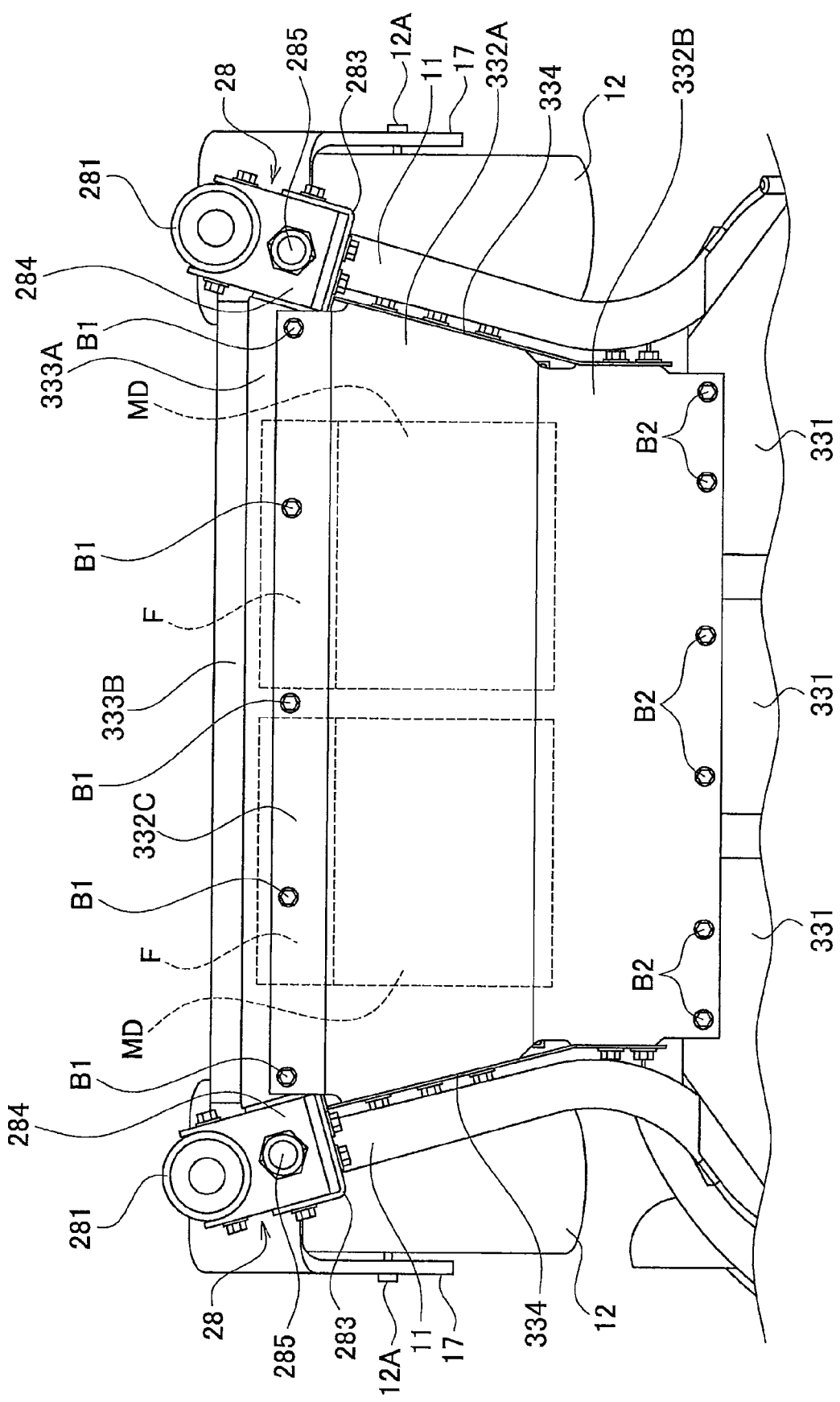
FIG. 20 A front close view of this embodiment of the electric ride-on mower.

The front of the electric ride-on mower 10 is shown in FIG. 18 to FIG. 20. The front of the electric ride-on mower 10 stores two mowing motor drivers MD, MD for controlling the mowing motors 15, 15. More specifically, the front of each chassis 11 (in other words, the front of the electric ride-on mower 10) stretches out towards the driving direction, and a motor driver case is set between the two chassis 11 here. The motor driver storage part is the area encircled by an upper part 332, a face part, a bottom part 335 and a pair of side parts 334. The mowing motor driver MD at the left is for the mowing motor 15 at the left whereas the mowing motor driver MD at the right is for the mowing motor 15 at the right. The mowing motor driver MD can be set horizontally.

The upper part 332 is made by a rectangular metal plate bent by a valley fold and a mountain fold, and has three parts: a front part 332A, a rear part 332B and a front edge part 332C. The front edge part 332C has holes, which are used for fixing the upper part 332 to an upper plane 332A of the front part by bolts B1. The rear part 332B has holes, and the holes are used for fixing the rear part 332B to a deck plate 331 by bolts B2. The deck plate 331 has three parts, the left part, the center part and the right part, and the three parts are joined together by bolts. The deck plate 331 is joined to the two chassis 11 by bolts B5. The front part 332A of the upper part 332 bends frontward and upward along the chassis 11.

The face part is made of metal and is bent twice. It is composed of an upper part 333A, a middle part 333B and a front part 333C. The face part stretches in the direction of the width of the electric ride-on mower 10. Slits (ventilation parts) 333SL are located at the lower part of the front part 333C. The slit 333SL is to help to take cooler air from the outside to cool down the mowing motor driver MD. The face part has a connecting part at both sides. Each connecting part is a part of the face part. The connecting part has holes, and the holes are used for fixing the face part to the front end of the chassis 11 by bolts. The front part 333C has holes, and the holes are used for fixing the front part 333C to the front end of the chassis 11 by bolts. The face part is set between the two suspensions 28, 28, which support the tire bracket 17 in a rotatable way. The tire bracket 17 holds the front tire 12 with the front tire shaft 12A in a rotatable way. The suspension 28 is composed of a cylindrical part 281, a spring coil 282, a coil case 283, a projecting part 284, a spring shaft 285 and a spring holding part 286. (The detail of the suspension 28 is described later). The back part 283B of the coil case 283 is welded to the top part 11F of the chassis 11.

The bottom part 335 is made of a rectangular metal plate curved in the middle and bent at its front, which forms a fixing flap. In addition, the metal plate is bent at its rear, which forms a fixing flap 335B. The front fixing flap has holes used for fixing the bottom part 335 to the front part 33 by bolts B4. The rear fixing flap 335B has holes used for fixing the bottom part 335 to the bottom of the chassis 11 by bolts B5.

The side part 334 is made of a metal plate vertically set between the upper part 332 and the bottom part 335 in order to cover the gap.

The mowing motor driver MD is set on the bottom part 335 and is fixed at both sides with connecting plates. The mowing motor driver MD is set by being inclined upward to a certain angle towards the front. (In other words, the bottom part 335, on which the mowing motor drive MD is set, inclines upward towards the front. This angle is approximately parallel to the front part of the chassis 11.) Fans F for cooling down the mowing motor driver MD are set at the front of the mowing motor driver MD.

Figure 21:
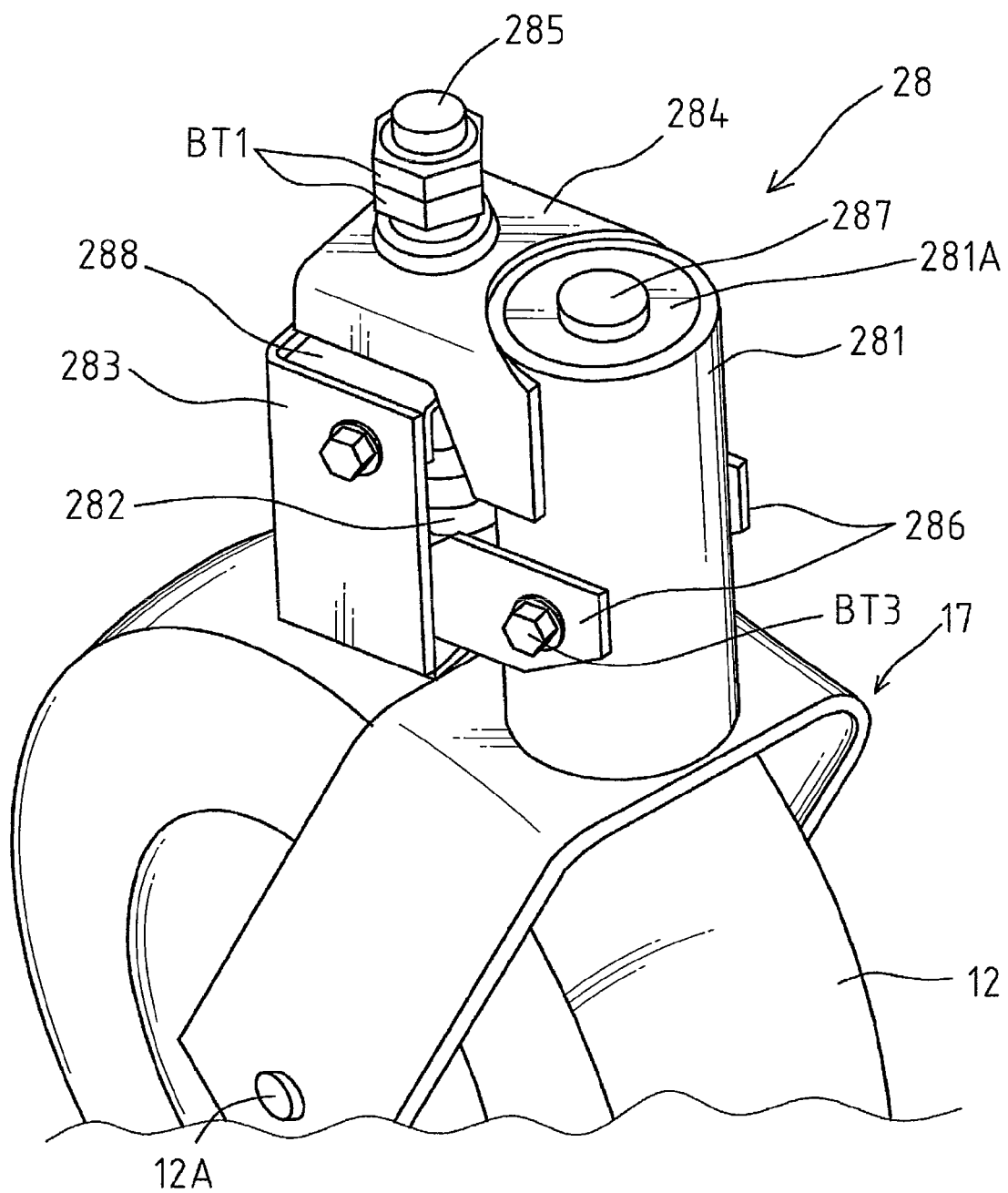
FIG. 21 A close perspective view of the suspensions.
Figure 22:
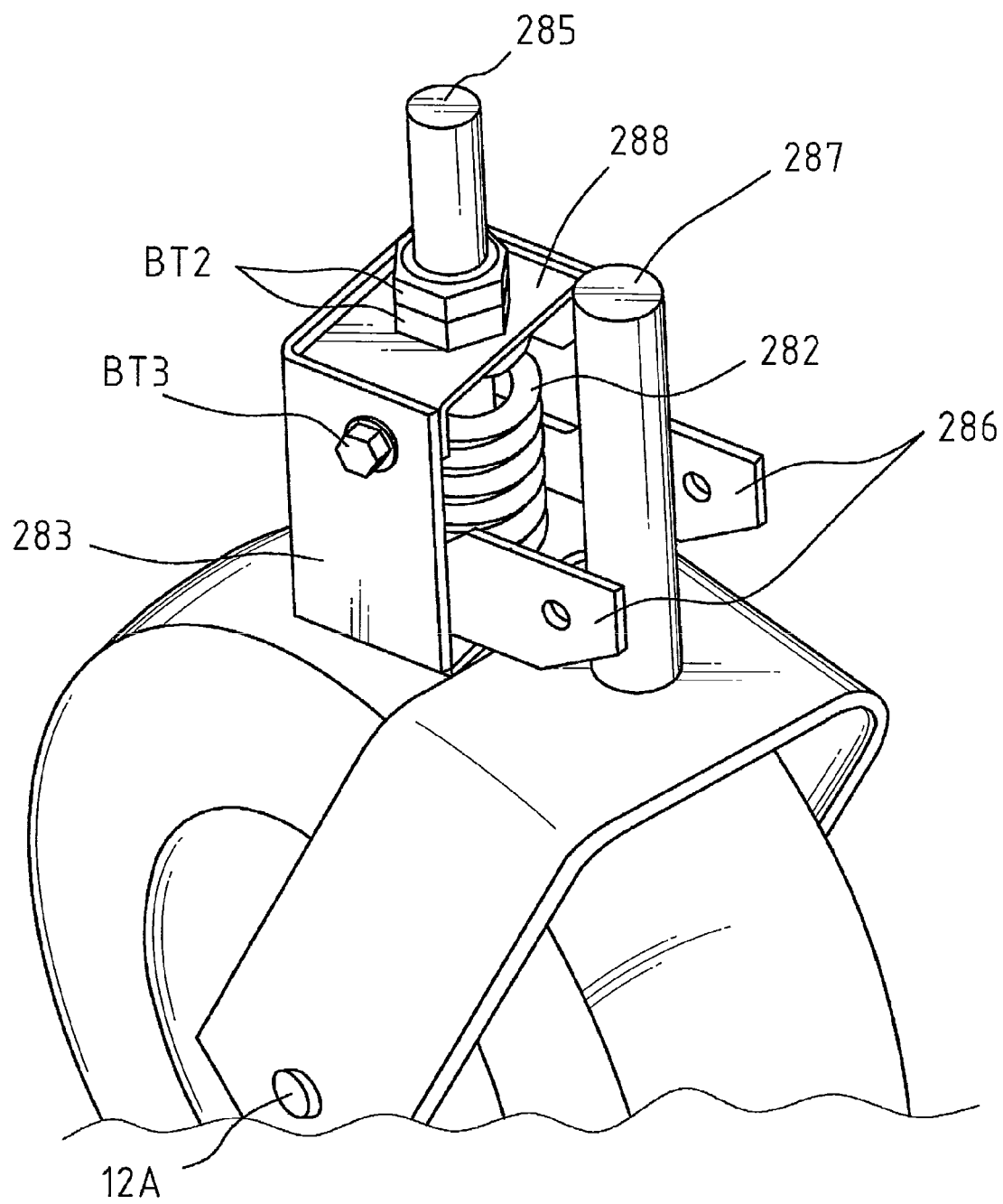
FIG. 22 A perspective view extracting the projecting part in FIG. 21.
Figure 23A:
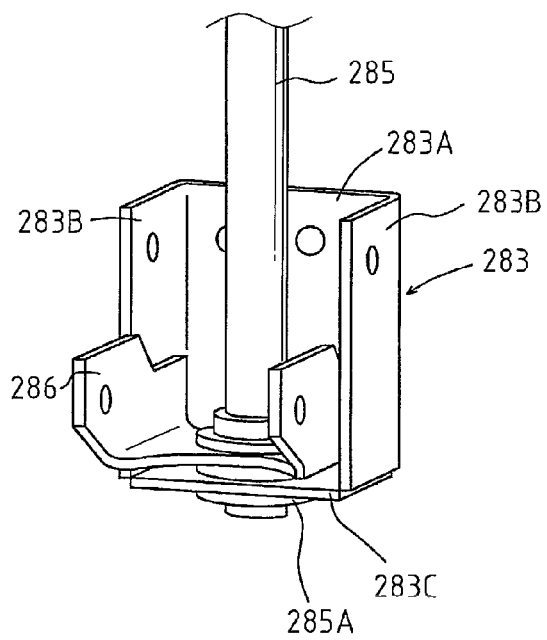
FIG. 23A A perspective view extracting the support part and the coil spring in FIG. 22, FIG. 23B A perspective view of the support part, FIG. 23C A perspective view of the coil spring case, and FIG. 23D A perspective view of the coil spring support part.
Figure 23B:
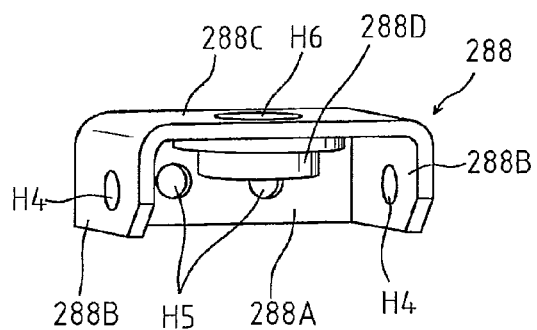
Figure 23C:
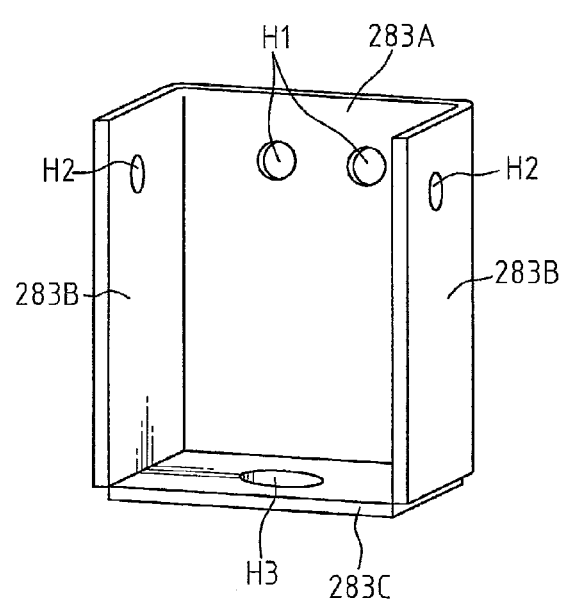
Figure 23D:
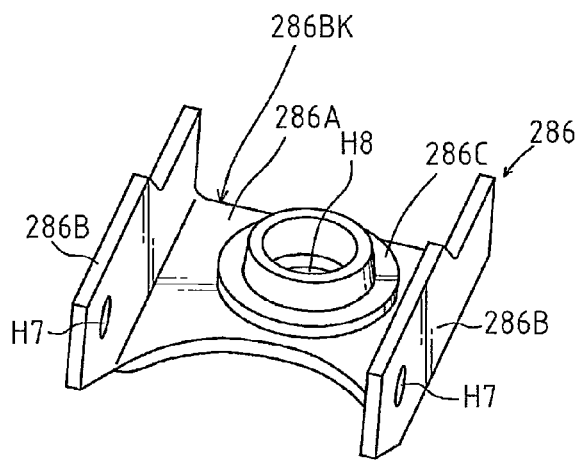

The detail of the suspension 28 is shown in FIG. 21 to FIG. 23. The suspension 28 is composed of the cylindrical part 281, the spring coil 282, the coil case 283, the projecting part 284, the spring shaft 285, the spring holding part 286, a bracket holding shaft 287 and a holding part 288.

The cylindrical part (a horizontally rotating and supporting part) 281 is made of a metal cylinder with both ends closed by a disk-like closing part 281A. The cylindrical part 281 has the bracket holding shaft 287 in it. The bracket holding shaft 287 extends along the central axis of the cylindrical part 281. The bracket holding shaft 287 is set on the top part of a front tire bracket (a front wheel supporting part) 17, which is made by bending a metal plate perpendicularly twice. The bracket holding shaft 287 is fixed to the top part of a front tire bracket 17 by bolts. The closing part 281A fits inside the cylindrical part 281. A hole for the bracket holding shaft 287 is located at the center of the closing part 281A. The bracket holding shaft 287 is inserted in the hole in a rotatable way. A groove is made circumferentially on the side surface of the bracket holding shaft 287. The closing part 281A fits in the groove and holds the bracket holding shaft 287. The bracket holding shaft 287 can turn freely at the closing part 281A. The closing part 281A is welded to the cylindrical part 281. A hole is made at the lower side of the cylindrical part 281. Another hole is made at the opposite side of the cylindrical part 281. A bolt BT3 is fit in these holes.

The projecting part 284 is welded to the upper side of the cylindrical part 281. The projecting part 284 is a rectangular metal plate bent perpendicularly twice. The projecting part 284 has a top part and a pair of side parts, each of which are set at one of two side ends of the top part perpendicularly at its sectional view. A hole is located at the top part of the projecting part 284. A cut part is located at the top part of the projecting part 284. The spring shaft 285 is set in the hole of the top part of the projecting part 284. There is a gap between the spring shaft 285 and the hole.

A male screw is located on the side surface of the spring shaft for two nuts BT1. The two nuts BT1 work together as a stopper to prevent the projecting part 284 coming off from the spring shaft 285 when the projecting part 284 goes up. There is a gap between nuts BT1 and the projecting part 284 under normal conditions.

The coil case 283 is composed of a back part 283A, a pair of side parts 283B, 283B and a bottom part 283C. These components are set perpendicularly. Two holes H1 are made in the back part 283A. A hole H2 is made in each side part 283B. A hole H3 for the spring shaft 285 is made in the bottom part 283C. An upper part 288 is fixed on the top of the coil case 283. The coil case 283 is welded to the top end 11F of the chassis 11 (FIG. 18).

The upper part 288 is composed of the back surface part 288A, a pair of side surface part 288B, 288B, an upper surface part 288C. These components are set perpendicularly. Two holes H5 are made in the back surface part 288A. A hole 114 is made in each side surface part 288B. A hole 116 for the spring shaft 285 is made in the upper surface part 288C. A short cylindrical projecting part 288D is welded to the back of the upper surface part 288C and matches the hole H6. The projecting part 288D is composed of an outer part and an inner part, which is higher than the outer part. The top end of the coil spring 282 touches the outside part of the projecting part 288D. The coil spring 282 is set to the inner side part of the projecting part 288D, which prevents the coil spring 282 from coming off A spring holding part 286 is set at the lower inside of the coil case 283. The spring holding part 286 is free to move vertically against the spring shaft 285. The spring holding part 286 is composed of a bottom surface part 286A and a pair of side surface parts 286B, 286B. These components are set perpendicularly. A hole H8 for the spring shaft 285 is made at the center of the bottom surface part 286A. A hole H7 is made in each side surface part 286B. A short cylindrical projecting part 286C is welded to the upper side of the bottom surface part 286A and matches the hole H8. The projecting part 286C is composed of an outer part and an inner part, which is higher than the outer part. The bottom end of the coil spring 282 touches the outside part of the projecting part 286C. The coil spring 282 is set to the inner side part of the projecting part 286C, which prevents the coil spring 282 from coming off.

The hole H8 of the spring holding part 286 and the hole 113 of the coil case 283 match so that the spring shaft 285 is set in the two holes H8, H3. The bottom end of the spring shaft 285 is fixed to the lower side of the bottom surface part 283C by a stopper 285A. The coil spring 282 is set to the spring shaft 285. The coil shaft 285 is set in the holding part 288. The holes H4, H4 of the side surface parts 288B and the holes H7, H7 of side surface part 286B match so that the bolts BT3 are set in the two holes H4, H7 and fix the holding part 288 with the coil case 283. Furthermore, the holes H5, H5 of the back surface part 288A and the holes H1, H1 of the back surface part 283A match so that the bolts (not shown) are set in the two holes H5, H1 and fix the holding part 288 with the coil case 283. The spring shaft 285 projecting above from the holding part 288 is fixed to the holding part 288 by the bolts B2. The male screw for the bolts B2 is made on the side surface of the spring shaft 285.

The projecting part 284 is fixed to the spring shaft 285 by nuts BT1, BT1. The holes H4, H4 of the spring holding part 286 and the hole of the cylindrical part 281 match and are joined by the bolts BT3, BT3. In doing so, the spring holding part 286 joins the cylindrical part 281. The back part 283A is welded to the top end 11F of the chassis 11.

Figure 24:
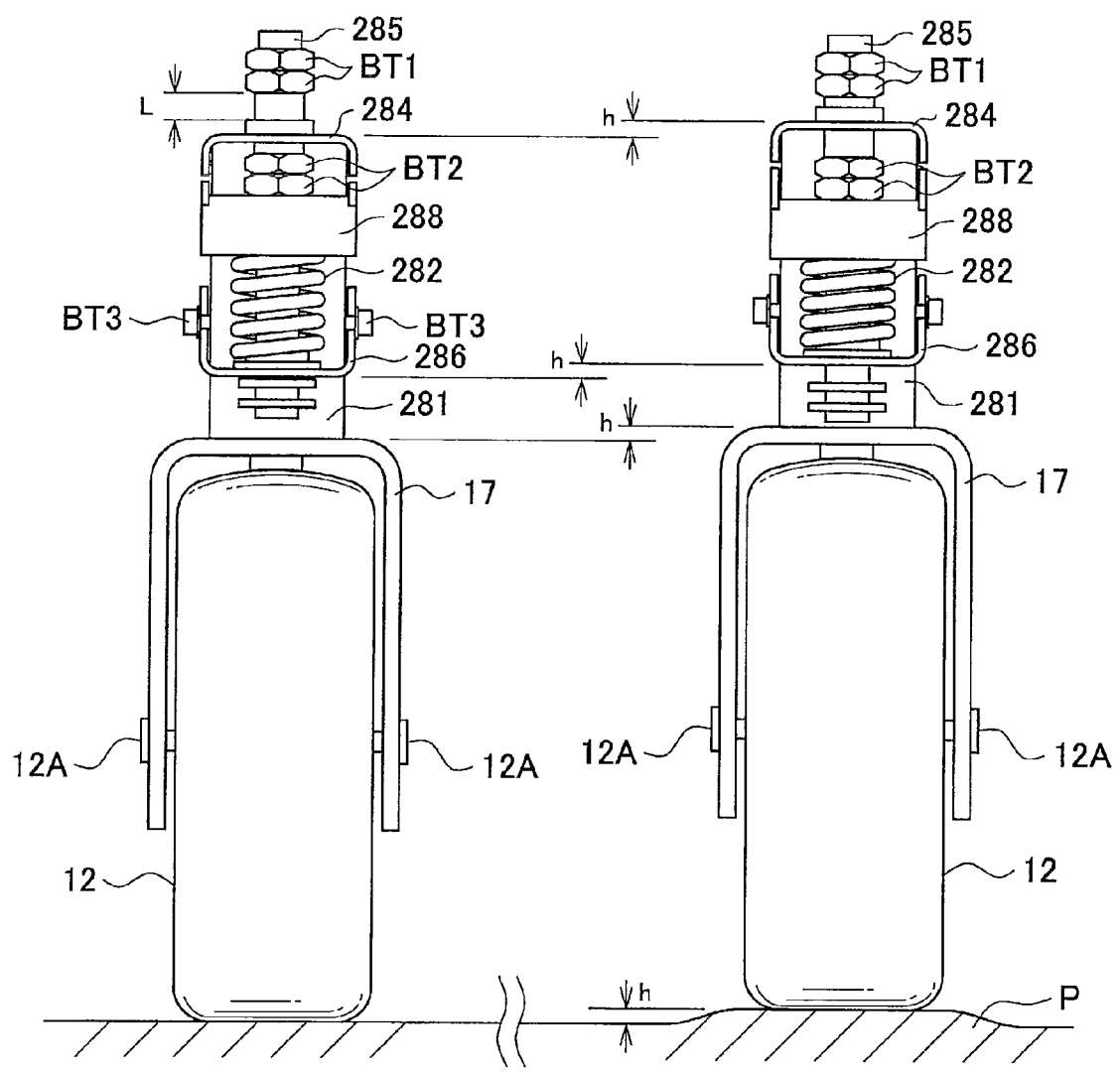
FIG. 24 Left side: The suspensions in which the mower is driving on flat ground, Right side: The suspensions in which the mower is driving on rough ground.
Figure 25:
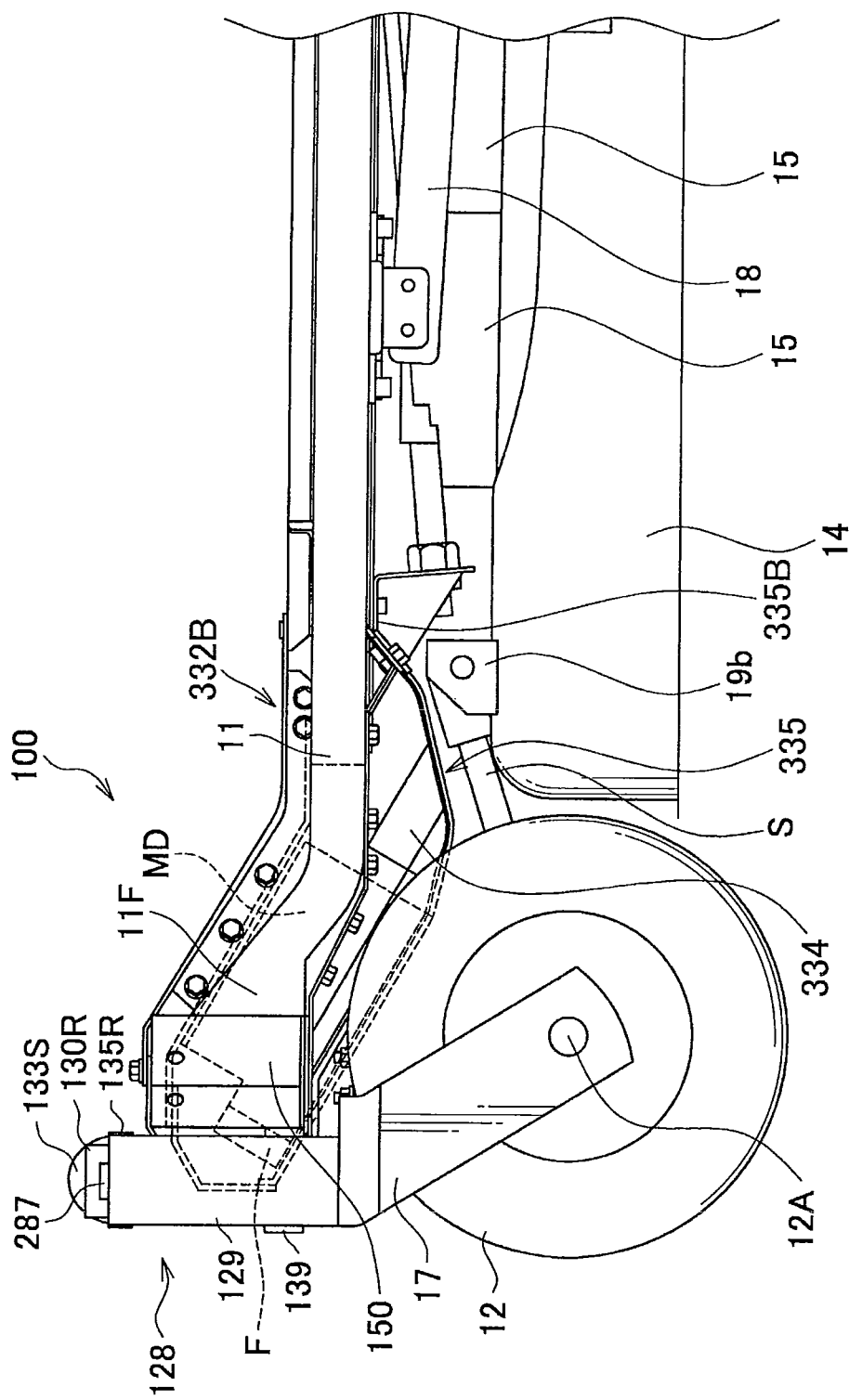
FIG. 25 A close side view of the further embodiment of the electric ride-on mower of this invention.
Figure 26:
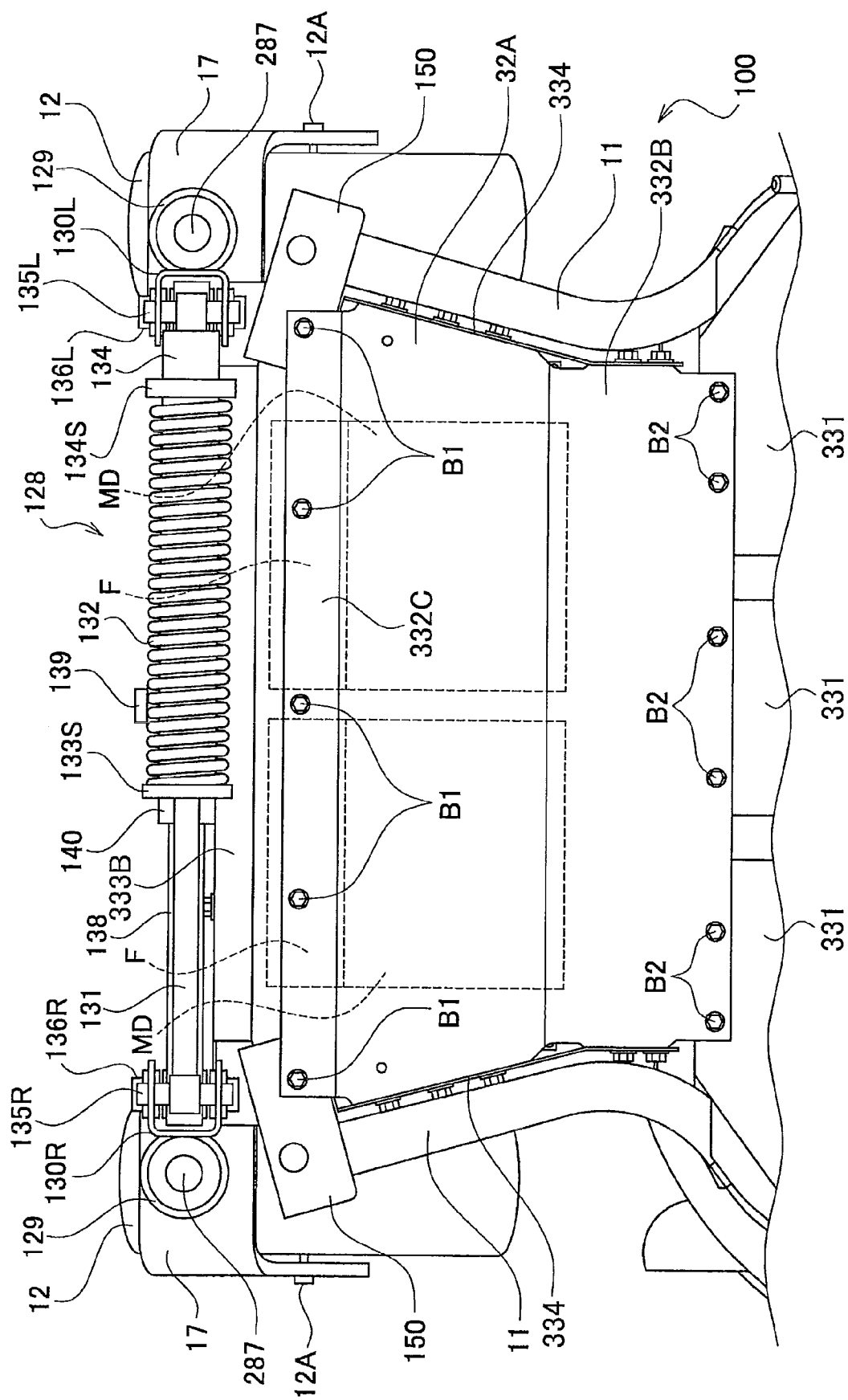
FIG. 26 A close front view of the electric ride-on mower.
Figure 27:
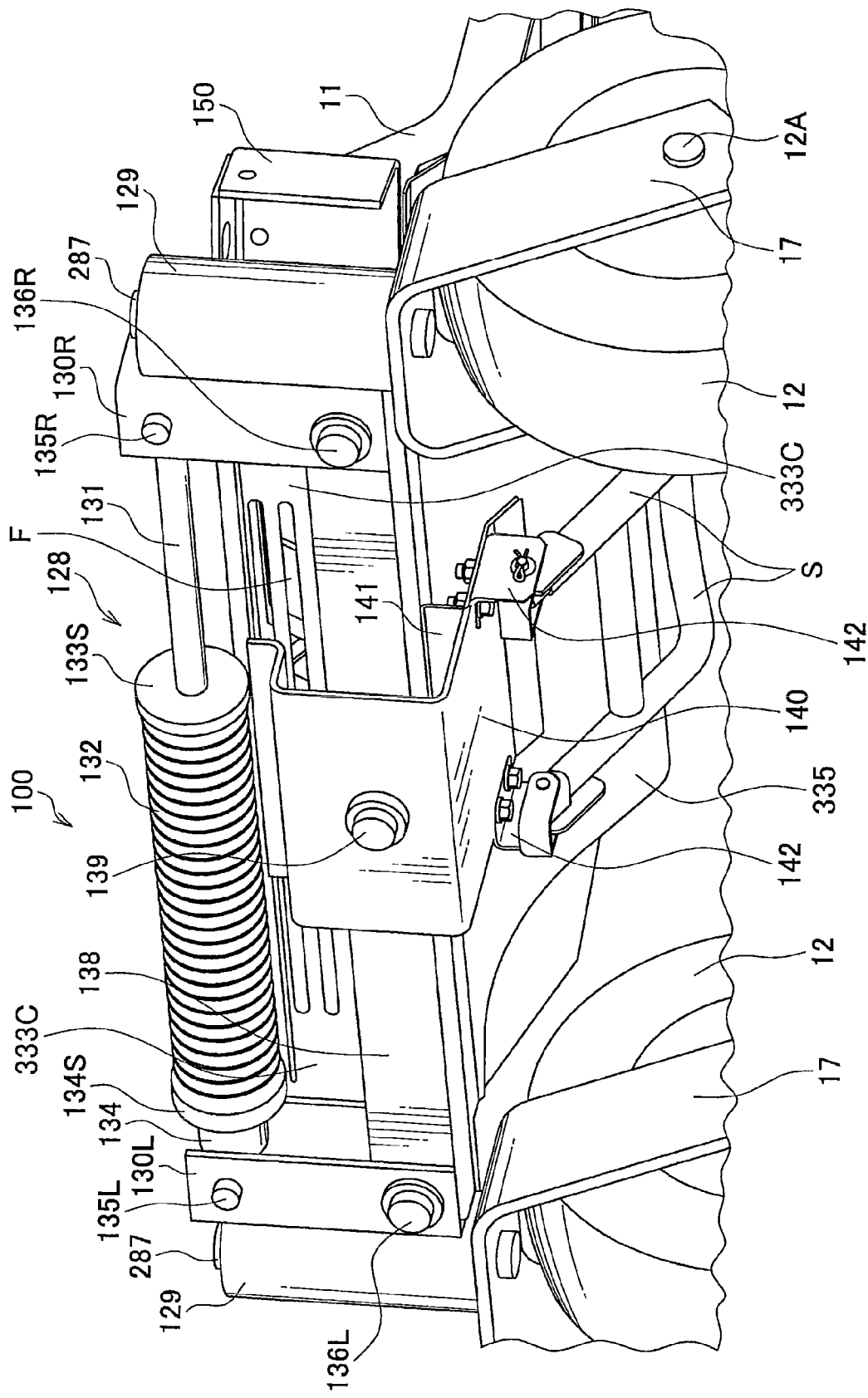
FIG. 27 A close perspective view of the electric ride-on mower.
Figure 28A:
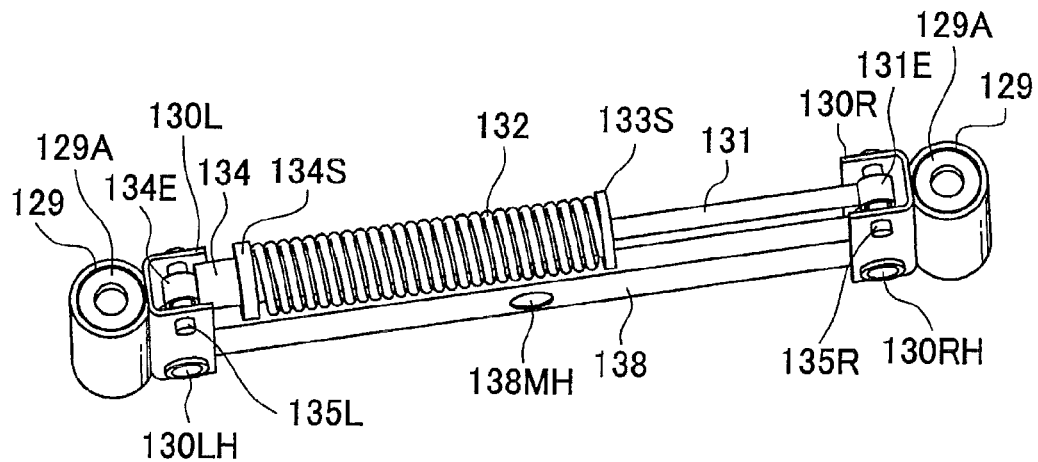
FIG. 28A A close perspective view of the main part of the suspensions, FIG. 28B A perspective view of the holding shaft and the coil shaft, and FIG. 28C A perspective view of the beam.
Figure 28B:
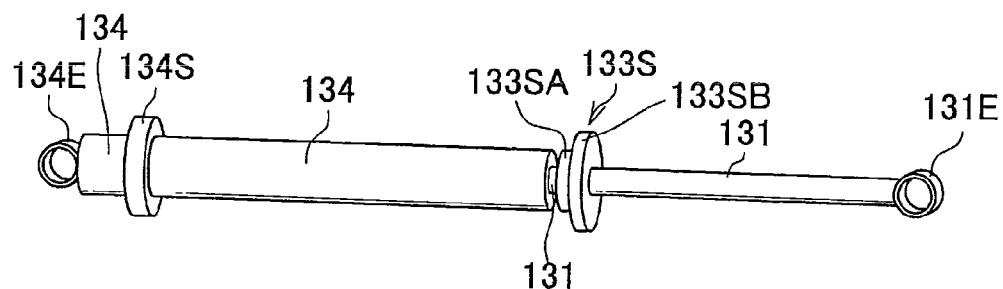
Figure 28C:
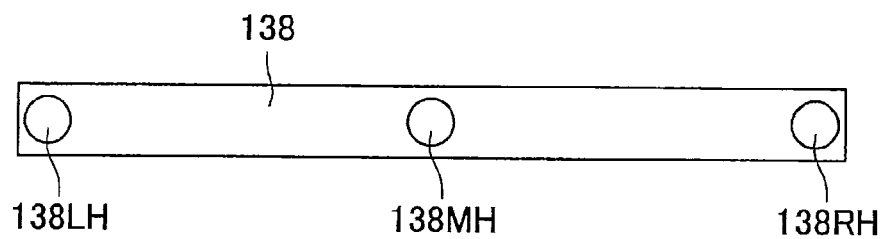

As shown in FIG. 24, with the suspensions 28, the front tire bracket 17 is moved up by a height h when the front tire 12 comes across a bump P (of height h) during driving of the electric ride-on mower 10. (In FIG. 24, the left side shows the suspension 28 when the front tire 12 is on flat ground, whereas the right side shows the suspension 28 when the front tire 12 is on the bump P.) When the front tire bracket 17 moves up within the height h, the cylindrical part 281 and the spring holding part 286 also move up with the front tire bracket 17 by the height h. The coil spring 282 is shrunk by the spring holding part 286 by a length equal to the height h because the lower end of the coil spring 282 touches the spring holding part 286. The projecting part 284, which is fixed to the cylindrical part 281, is also moved up along the coil shaft 285 by the height h. If the height h of the bump P from the ground is lower than the gap L between the nut BT1 and the projecting part 284, the projecting part 284 does not touch the nut BT1.

If the gap L is bigger than the height h of the bump P, the projecting part 284 touches the nut BT1 and cannot move up further. In this case, the suspension 28 cannot absorb the height h of the bump P and the main body of the mower will receive the impact of the bump P. Therefore, it is better to make the gap L longer so that the suspension 28 can absorb the larger bump and prevent the main body of the electric ride-on mower 10 receiving the impact from the ground. On the other hand, to make the gap L bigger, the spring shaft 285 should be longer. Therefore, the components of the front of the electric ride-on mower 10 will be bigger and the body cover 20 should also be higher at its front.

The coil spring 282 can be replaced by another elastic part. The electric ride-on mower 10 does not need to equip the suspension 28. If there is no suspension 28, the components of the front tire section are the cylindrical part 281, the closing part 281A and the bracket holding shaft 287. The cylindrical part 281 is welded to the front end of the chassis 11 at its side.

Further Embodiment 2

A further embodiment is shown in FIG. 25 to FIG. 28. The electric ride-on mower 100 has suspension 128. The suspension 128 in composed of a cylindrical part (a horizontally rotating and supporting part) 129, a coil spring 132, a holding part (a slide part) 131, a coil holding part (a holding part) 134, a holding part 130R, 130L, a stopper (a slide part stopper) 133S, a stopper (a holding part stopper) 134S and a beam 138. An elastic part is composed of the coil spring 132, the holding part 131 and the coil holding part 134. The elastic part works so that the beam 138 remains horizontal. The beam 138 is set along the direction of the width of the electric ride-on mower 100. Connecting parts 150, 150 are welded to the front end of each chassis pair 11. Other components of this embodiment of the electric ride-on mower 100 are the same as those of the previously described embodiment of the electric ride-on mower 10; therefore, these details are not described here.

The connecting part 150 is made of a rectangular metal plate bent perpendicularly, and the connecting part 150 has a top part. A hole is located in the top part. The hole is used to join the connecting part 150 with the front edge part 332C of the upper part 332 by the bolt B1. The connecting part 150 is put on the front of the bottom part 335.

The cylindrical part 129 is set in front of the front tire bracket (a front wheel supporting part) 17. The cylindrical part 129 is a metal cylinder, and both its ends are closed by a disk-like closing part 129A. The cylindrical part 129 contains the bracket holding shaft 287. The bracket holding shaft 287 extends along the central axis of the cylindrical part 281. The bracket holding shaft 287 stands on the top part of a front tire bracket 17, and is fixed to the top part of a front tire bracket 17 by a bolt. The closing part 129A fits inside the cylindrical part 129. A hole for the bracket holding shaft 287 is located at the center of the closing part 129A. The bracket holding shaft 287 fits in this hole in a rotatable way. A groove is made circumferentially on the side surface of the bracket holding shaft 287. The closing part 129A fits in the groove and holds the bracket holding shaft 287. The bracket holding shaft 287 can turn freely at the closing part 129A. The closing part 129A is welded to the cylindrical part 129.

The cylindrical parts 129, 129 are welded to the holding part 130R or 130L. The welded part of the cylindrical part 129 is formed flat so that the cylindrical part 129 and the holding parts 130R, 130L can be fixed firmly. The holding part 130R, which is made of a rectangular metal plate being bent perpendicularly twice, has three flat parts. The central part is welded to the cylindrical part 129, and the other two parts face each other. The two parts each have two holes: one is located in the upper part, the other in the lower part. The two holes of one part face the corresponding two holes of the other part. The upper holes in the two parts are for a pin 135R, whereas the lower holes 130RH in the two parts are for a pin 136R. The pin 136R is rotatable in the hole 130RH. The holding part 130L is the same as the holding part 130R. Namely, the holding part 130L, which is made of a rectangular metal plate bent perpendicularly twice, has three flat parts. The central part is welded to the cylindrical part 129, and the other two parts face each other. The two parts each have two holes: one is located in the upper part, the other in the lower part. The two holes of one part face the corresponding two holes of the other part. The upper holes in the two parts are for a pin 135L, whereas the lower holes 130LH in the two parts are for a pin 136L. The pin 136L is rotatable in the hole 130LH.

The coil spring 132 is set between the stopper 133S and the stopper 134S. The stopper 133S is set at the end of the holding part 131. The stopper 133S is composed of a metal short columnar projecting part 133SA, 133SB. The outer diameter of the projecting part 133SA is nearly identical to the coil holding part 134. The outer diameter of the projecting part 133SB is the same size as or larger than the coil spring 132. A hole is made at the center of the projecting part 133SA, and a hole is made at the center of the projecting part 133SB. The holding part 131 is set in these holes and is welded to the projecting parts 133SA, 133SB.

The stopper 134S is a short metal column set at the front of the coil shaft 134. The outer diameter of the stopper 134S is the same size as or larger than the coil shaft 134. A hole is made at the center of the stopper 134S. The coil shaft 134 is set in the hole and welded to the stopper 134S.

A hole is located at one end of the coil shaft 134 such that the hole extends along the axis of the coil shaft 134. The end of the holding part 131 is set in this hole, and the holding part 131 can move along the coil holding part 134. In other words, the holding part 131 is set inside the hole of the coil holding part 134 so that the holding part 131 cannot detach from the hole.

The side of a rotation support part 131E, which is a metal cylinder, is welded to the top end of the holding part 131. The inner diameter of the rotation support part 131E is larger than the outer diameter of the pin 135R. The side of a rotation support part 134E, which is a metal cylinder, is welded to the top end of the coil shaft 134. The inner diameter of the rotation support part 134E is larger than the outer diameter of the pin 135L.

The beam 138 is made of a rectangular metal plate bent perpendicularly twice. The two parts, which face each other, have a hole 138MH at the center, a hole 138RH at the right end, and a hole 138LH at the left end. The inner diameter of the hole 138MH is larger than the outer diameter of the pin (a rotation center) 139. The pin 139 is set in between the two chassis 11, and the axis of the pin 139 is set towards the front of the electric ride-on mower 100. The inner diameter of the hole 138RH is larger than the outer diameter of the pin 136R. The inner diameter of the hole 138LH is larger than the outer diameter of the pin 136L.

The coil spring 132 is set on the coil holding part 134, and the holding part 131 is fit in the coil holding part 134. The coil spring 132 is compressed at this stage, wherein the length of the coil spring 132 is M. The pin 135R fits in the rotation support part 131E whereas the pin 135L fits in the rotation support part 134E. The pin 135R is fixed to the holding part 130R whereas the pin 135L is fixed to the holding part 130L. On the other hand, the beam 138 is set in the lower part of the holding parts 130R, 130L, then the hole 130RH and the hole 138RH are matched. The beam 138 is joined to the holding part 130R by the pin 136R, and the beam 138 is joined to the holding part 130L by the pin 136L, and then, the suspension 128 is made.

When the pin 139 is set between the bracket 140 and the hole 138MH, the suspension 128 (and the beam 138) is fixed on the main body in a rotatable way in vertical. The rotation point of the suspension 128 is the pin 139. The bracket 140 is made by bending a rectangular metal plate. One end of the bracket 140 is welded to the front part 33C whereas the other end of the bracket 140 is welded to the bottom part 35. The shaft S is hung by the bracket 140 with the stay 142. The stay 141 holds the bracket 140, with one end welded to the bracket 140 whereas the other end is welded to the bottom part 35.

In this embodiment, the motor driver MD of the mowing motor 15 is set on the bottom part 35.

Figure 29A:
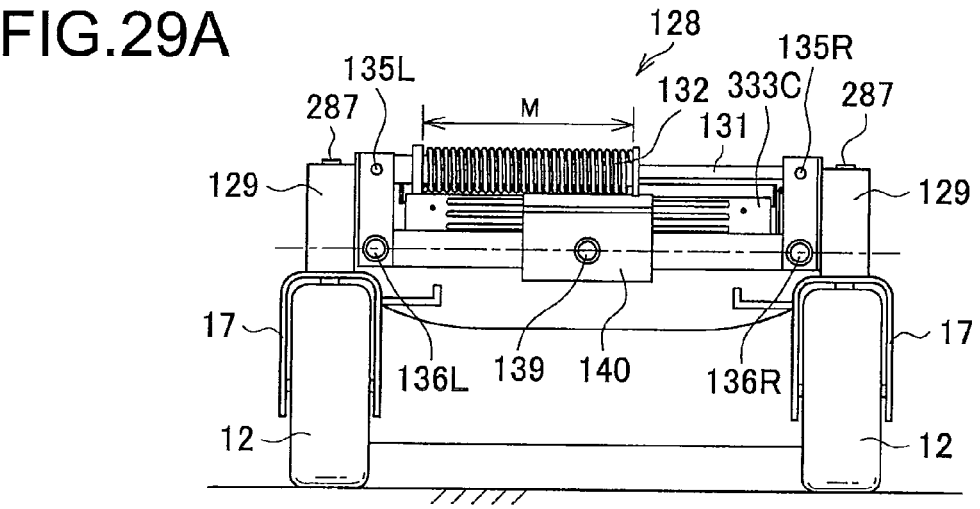
FIG. 29A The electric ride-on mower driving on flat ground, FIG. 29B The electric ride-on mower driving on rough ground at the left wheel, and FIG. 29C The electric ride-on mower driving on rough ground at the right wheel.
Figure 29B:
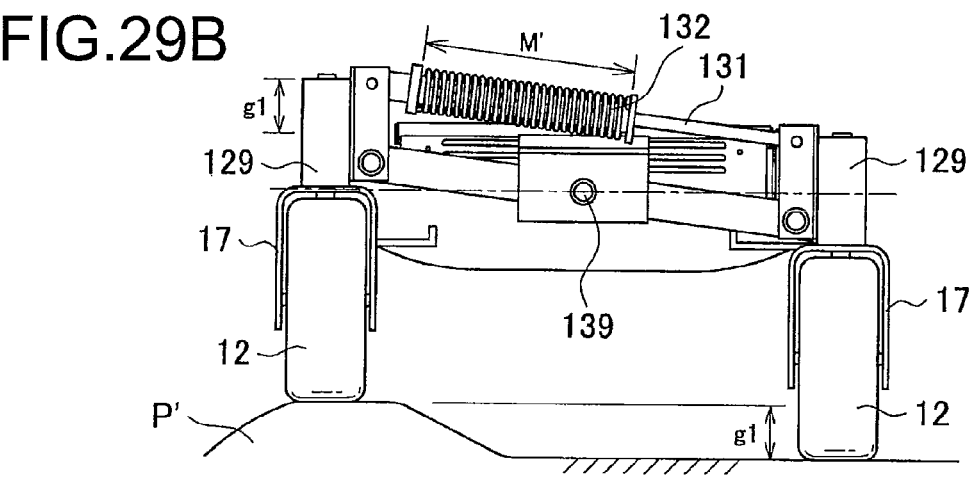
Figure 29C:
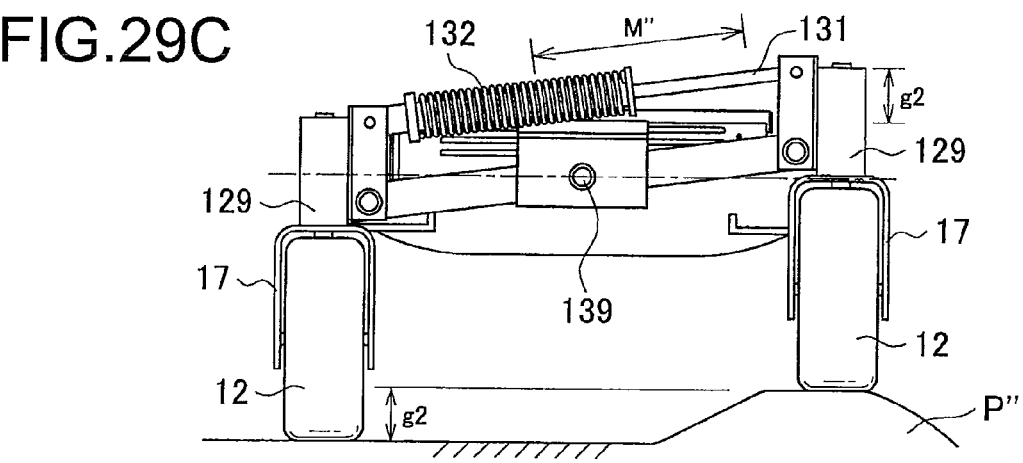

The electric ride-on mower 100 running is shown in FIG. 29A to FIG. 29C. When the electric ride-on mower 100 runs on flat ground (FIG. 29A), the coil spring 132 has the length M. The suspension 128 is horizontal. When the left front tire 12 goes over the bump P' of height gl (FIG. 29B), the left cylindrical part 129 becomes higher than the right cylindrical part 129 by the height gl. At this stage, the suspension 128 rotates at the pin 139 (the rotation center) in such a way that the left end becomes higher than the right end. The holding part 131 moves towards the right in the figure. (Namely, the holding part 131 moves off from the coil shaft 134.) Then, the distance between the stopper 133S and the stopper 134S, and the coil spring 132 extends with a length M". The front tires 12, 12 are able to follow the undulation of the ground and absorb the impact from the ground.

THE APPLICABILITY TO THE INDUSTRY

The ride-on mower in this invention is applicable to all grasses. In addition, it is not necessary for the ride-on mower to use motors for power.

THE EXPLANATION OF SIGNS 10, 100 Electric lawn mower (Electric ride-on mower)
11 Chassis
12 Front tire (Front wheel)
12A Front tire shaft
13 Rear tire (Rear wheel)
14 Mower deck
15 Mowing motor
16 Driving motor
17 Front tire bracket (Front wheel holding part)
18 Deck support arm 20 Body cover
22 Driving lever
24 Mower deck lifting lever (a lifting lever)
25 Battery
28, 128 Suspension
30 Booster
79, 80 Stop arm (Lock plate)
90 Mower deck height setting part
91, 92 Guide plate
91N, 92N Notch
129, 281 Cylindrical part (Horizontally rotating and supporting part)
131 Holding part (Slide part)
132 Coil spring
133S Stopper (Slide part stopper)
134 Coil holding part (Holding part)
134S Stopper (Holding part stopper)
135R, 135L Pin
138 Beam
139 Pin (Rotation center)
282 Coil spring
F Fan
FS Electricity filler opening
MD Mowing motor driver
ST Step

What is claimed is:

1. A ride-on mower having:
driving motors;
mower blades spinning for mowing grasses;
mowing motors for the mower blades;
batteries for the driving motors and the mowing motors;
a mower deck for covering the mower blades from the above and sides and for setting the mowing motors on;
a mower deck lifting device for lifting up and down the mower deck set at the center of the on the mower deck, the mower deck lifting device including a booster for assisting the mower deck lifting device to lift the mower deck up and down
a rotatable lifting lever for lifting the mower deck up and down with the mower deck lifting device, the rotatable lifting lever includes lock plates that are displaceable and at least one coil spring that biases one of the lock plates downward; and
guide plates installed at the side of the lifting lever, the guide plates being configured to set the mower deck at different heights, each of the guide plates having multiple notches, the guide plates being installed in parallel and at different levels, the guide plates being installed separately so that the notches of each guide plate cannot be matched with the notches of the other guide plates,
wherein the at least one coil spring biases one of the lock plates to engage one of the notches to hold the position of the lifting lever while another of the lock plates does not engage any of the notches, and
wherein the lock plates are able to reach the notches of all the guide plates.

2. The ride-on mower as set forth in claim 1, having a pair of chassis stretching out towards the driving direction, wherein:
one end of a pair of deck support arms is fixed to each side of the mower deck in a rotatable way,
another end of a pair of deck support arms is fixed to each chassis in a rotatable way, and
the mower deck lifting device is fixed to the deck support arms through a link mechanism.

3. The ride-on mower as set forth in claim 1, wherein:
the guide plates are set at one side of the lifting lever.

4. The ride-on mower as set forth in claim 1, wherein:
the guide plates are set at both sides of the lifting lever.

5. The ride-on mower as set forth in claim 1, having:
a pair of chassis stretching out towards the driving direction,
suspensions set at the front of each chassis, which are able to work independently,
front wheels, which turn freely and are set underneath the suspensions,
front wheel shafts set at the turning center of each front wheel, and
front wheel holding parts for holding the front wheel shaft.

6. The ride-on mower as set forth in claim 5, having:
horizontally rotating support parts for supporting the front wheel holding part horizontally in a rotatable way, wherein:
the suspensions are set in the horizontally rotating support parts.

7. The ride-on mower as set forth in claim 1, having:
a pair of chassis stretching out towards the driving direction,
a turning center set between the chassis,
a beam, which turns around the turning center and stretches out towards the side direction of the main body,
elastic parts for keeping the beam horizontal,
front wheel holding parts for horizontally holding the front wheels in a rotatable way, and
horizontally rotating support parts for holding the front wheel holding part horizontally in a rotatable way, wherein:
the lower part of the horizontally rotating support parts are fixed at each end of the beam, and
the elastic part is set at the upper part of the horizontally rotating support part.

8. The ride-on mower as set forth in claim 7, wherein the elastic part includes:
a holding part,
a sliding part able to slide in the holding part, and
a coil spring set to touch both a holding part stopper, which is fixed at the surface of the holding part, and a sliding part stopper, which is fixed at the surface of the sliding part.

9. The ride-on mower as set forth in claim 1, wherein the booster includes a pair of coil springs extending in a longitudinal direction of the mower.

10. The ride-on mower as set forth in claim 2, wherein the booster includes a pair of coil springs extending in a longitudinal direction of the mower and being located between the pair of chassis.

11. The ride-on mower as set forth in claim 10, wherein an entirety of the booster is located below the pair of chassis.

12. The ride-on mower as set forth in claim 10, wherein the pair of coil springs are spaced an equal distance from a center axis of the mower deck, the center axis extending in the longitudinal direction of the mower.

* * * * *